(12) United States Patent
Kawakami et al.

(10) Patent No.: US 8,408,823 B2
(45) Date of Patent: Apr. 2, 2013

(54) FOCAL-PLANE SHUTTER FOR DIGITAL CAMERA

(75) Inventors: Kenta Kawakami, Saitama (JP); Nobuyoshi Inoue, Kawagoe (JP)

(73) Assignee: Nidec Copal Corporation, Tokyo (JP)

(*) Notice: Subject to any disclaimer, the term of this patent is extended or adjusted under 35 U.S.C. 154(b) by 27 days.

(21) Appl. No.: 13/249,805

(22) Filed: Sep. 30, 2011

(65) Prior Publication Data

US 2012/0141110 A1 Jun. 7, 2012

(30) Foreign Application Priority Data

Sep. 30, 2010 (JP) ................. 2010-221676

(51) Int. Cl.
*G03B 9/08* (2006.01)
*G03B 9/10* (2006.01)
(52) U.S. Cl. ...................... 396/456; 396/493
(58) Field of Classification Search .......... 396/456, 396/493
See application file for complete search history.

(56) References Cited

U.S. PATENT DOCUMENTS

| | | | | |
|---|---|---|---|---|
| 4,143,957 A | * | 3/1979 | Nemoto et al. | 396/502 |
| 4,364,654 A | * | 12/1982 | Senuma et al. | 396/466 |
| 4,408,856 A | * | 10/1983 | Suzuki et al. | 396/466 |
| 8,197,150 B2 | * | 6/2012 | Yamaguchi et al. | 396/453 |
| 8,348,526 B2 | * | 1/2013 | Shintani | 396/357 |
| 2011/0129212 A1 | * | 6/2011 | Yamaguchi et al. | 396/463 |
| 2011/0176799 A1 | * | 7/2011 | Shintani | 396/484 |

FOREIGN PATENT DOCUMENTS

| JP | 2001-305605 | 11/2001 |
|---|---|---|
| JP | 2004-317590 | 11/2004 |

* cited by examiner

*Primary Examiner* — Rodney Fuller
(74) *Attorney, Agent, or Firm* — Wenderoth, Lind & Ponack, L.L.P.

(57) ABSTRACT

When photographing using an optical finer, a hold member rotates, and a pressing member pushes a pushed portion of an iron piece member to rotate an unlocking member for a first blade and an unlocking member for a second blade to bring the iron piece member into contact with an iron core member of an electromagnet. When photographing using an electronic finder, a permanent magnet rotor of an electromagnetic device is rotated in a state where the electromagnet is not magnetized, a deterring member is made to face the operation locus of a deterred portion of the unlocking member for a second blade, and then, the hold member is rotated. Thereby, the unlocking member for a second blade is deterred by the deterring member so as to allow observation using the electronic finder without pushing the locking member for a second blade.

7 Claims, 14 Drawing Sheets

FOCAL-PLANE SHUTTER FOR DIGITAL CAMERA

CROSS-REFERENCE TO RELATED APPLICATION

This application is based upon and claims the benefit of priority of Japanese Patent Application No. 2010-221676 filed on Sep. 30, 2010, the contents of which are incorporated herein by reference in its entirety.

BACKGROUND ART

The present invention relates to a focal plane shutter for a digital camera.

Some of focal plane shutters for a digital camera include two shutter blades called a first blade and a second blade. In this type of focal plane shutter, usually, a first blade and a second blade are coupled to a driving member for a first blade and a driving member for a second blade similarly to a focal plane shutter for a camera using a film. Thus, in a setting state in a photographing standby state, the first blade covers an exposure opening, and the second blade withdraws from the exposure opening. When photographing is performed, the two driving members are rotated in order in the same direction by the urging force of a driving spring for a first blade and the urging force of a driving spring for a second blade, the first blade opens the exposure opening, and the second blade closes afterward so as to expose an imaging surface of an imaging device. Therefore, it is common that a digital camera including the focal plane shutter of such a configuration has an optical view finder (hereinafter referred to as an optical finder).

Additionally, in the focal plane shutter for a digital camera of such a configuration, if the second blade fully closes the exposure opening, imaging information is stored in a storage device via an information processing circuit from the imaging device, and a setting operation is performed immediately. However, in the setting operation, a setting member rotated from an initial position reverses two driving members thereof to a setting position against the urging force of each driving spring. As a configuration for maintaining the two driving members in the setting state until the next photographing is performed, focal plane shutters called a locking type and a direct type are known.

That is, in the focal plane shutter called the locking type, the two driving members are locked by locking members until the first blade and the second blade are made to perform an exposure operation when photographing is performed. Therefore, the setting member can be adapted to be immediately returned to an initial position if the two driving members can be locked by the respective locking members at setting positions by the setting operation. However, at the time of the release of the camera, the setting member can also be adapted so as to be returned to the initial position prior to the opening operation of the first blade. The exposure operation of the first blade and the second blade is performed as two release means whose operation is allowed in order by the respective electromagnets release the lock of the respective driving members by the respective locking members.

In contrast, in the focal plane shutter called the direct type, the two driving members include iron piece members, respectively, and the setting member rotates the two driving members against the urging forces of the respective driving springs until the iron piece members thereof come into contact with respective electromagnets which are not yet magnetized by the setting operation. Therefore, the setting member is not immediately returned to the initial position, and maintains the state even after that, and the setting member is returned to the initial position if the respective electromagnets are magnetized and the iron piece members thereof are attracted and held by magnetic attractive forces, at the time of the release of the camera. After that, the exposure operation of the first blade and the second blade is performed as the respective electromagnets are demagnetized in order and the attractive holding forces of the respective iron piece members are lost.

Although the invention relates to the locking type focal plane shutter for a digital camera including the first blade and the second blade in the above shutters, JP-A-2001-305605 discloses such a locking type focal plane shutter for a camera which can be adopted not only for a digital camera but also for a camera using a film.

Among the focal plane shutters for a digital camera including the first blade and the second blade, there is one that performs photographing by using an electronic view monitor (hereinafter referred to as a monitor) including display panels, such as a liquid crystal display panel or an EL (electroluminescence) display panel, instead of the optical finder though not the locking type described in JP-A-2001-305605. Additionally, in that case, it is known that an imaging device for photographing is made to be used also as an imaging device for a monitor. An example of focal plane shutters for a digital camera which allows such a configuration to be realized is described in JP-A-2004-37590.

In the focal plane shutter described in JP-A-2004-317590, both a first blade and a second blade are brought into a state where the blades have withdrawn from an exposure opening in a photographing standby state. If a release button is pushed when photographing is performed, in the initial stage, operation is made in a state where the first blade has covered the exposure opening. In the next stage, if the release button is pushed when performing photographing, in addition to photographing in a mode in which the first blade and the second blade are made to perform an exposure operation, photographing in a mode in which an electronic control circuit controls an imaging device to start photographing, and the second blade closes the exposure opening to end photographing, or photographing in a mode in which the electronic control circuit is adapted to control both the start and end of photographing can be performed without operating the first blade. Moreover, while the release button is pushed, an electronic control circuit repeats a predetermined operation so that the photographing of a moving image can be performed.

SUMMARY OF THE INVENTION

Even in the case of the digital camera including the locking type focal plane shutter described in JP-A-2001-305605, it is required that the photographing using a monitor can also be performed as in the focal plane shutter described in JP-A-2004-317590 by providing switching means other than photographing using an optical finder. However, it is possible to provide a focal plane shutter as described in 2004-317590 by adopting the configuration of the focal plane shutter described in JP-A-2004-317590 for the locking type focal plane shutter. However, it is difficult to select one of the plurality of modes so that photographing can be performed.

The invention has been made to solve such a problem, and the object thereof is to provide a locking type focal plane shutter for a digital camera including two shutter blades, which allows the photographing in a photographing mode using an optical finder and also the photographing in the photographing mode using a monitor adapted such that an imaging device for a monitor is also used as an imaging device for photographing as a photographer makes an operation in advance before photographing.

In order to achieve the above object, the invention provides a focal plane shutter for a digital camera including: a first blade and a second blade which are individually arranged in two blade chambers adapted such that a space between a shutter ground plate and an auxiliary ground plate is partitioned by an intermediate plate; a driving member for a first blade and a driving member for a second blade which are coupled to the first blade and the second blade, and respectively rotated by the urging force of a driving spring for a first blade and the urging force of a driving spring for a second blade to cause the first blade and the second blade to perform an exposure operation, if a lock caused by a locking member for a first blade and a lock caused by a locking member for a second blade are released in order; a setting member which is located at an initial position retreated out of operation loci of the two driving members when the first blade and the second blade perform an exposure operation, starts a setting operation from the initial position if the exposure operation is completed, and rotates the two driving members to positions capable of being locked to the two locking members against the urging forces of the two driving springs so as to return the driving members to the initial position before photographing; unlocking means for a first blade and unlocking means for a second blade which are respectively attracted to and held by iron core members of an electromagnet for a first blade and an electromagnet for a second blade when an electric current is applied to coils of the two electromagnets, and are respectively separated from the iron core member against an urging force of a release spring for a first blade and an urging force of a release spring for a second blade to individually release the lock of the two driving members by the two locking members, if application of an electric current to the coils of the two electromagnets is cut off in order; holding means which is operated so as to interlock with the setting operation of the setting member, pushes the two unlocking means against the urging forces of the two release springs to bring the unlocking means into contact with the two iron core members, and is operated out of the operation loci of the two unlocking means if an electric current is applied to the coils of the two electromagnets; an electromagnetic device having a reciprocable moving element; and deterring means which is operated to reciprocate by the moving element, and is advanced and retreated in the operation locus of the unlocking means for a second blade. When the unlocking means for a second blade comes into contact with the iron core member of the electromagnet for a second blade and when the deterring means is advanced into the operation locus of the unlocking means for a second blade, the holding means is operated out of the operation loci of the two unlocking means without application of an electric current to the coils of the two electromagnets, and accordingly, the deterring means deters the operation of the unlocking means for a second blade which is separated from the iron core member of the electromagnet for a second blade before the lock of the driving member for a second blade by the locking member for a second blade is released, and then, if the electromagnetic device operates the deterring means out of the operation locus of the unlocking means for a second blade, the unlocking means for a second blade releases the lock of the driving member for a second blade by the locking member for a second blade.

In that case, the deterring means may be integrated with the moving element of the electromagnetic device. Additionally, the moving element may be a rotor having a permanent magnet, or the electromagnetic device may be a plunger.

Additionally, in the focal plane shutter for a digital camera of the invention, the driving member for a second blade includes a first driving member for a second blade and a second driving member for a second blade which are rotatably attached on the same axle, the first driving member for a second blade is coupled to the first blade, and rotates to follow the second driving member for a second blade by the urging force of a setting spring during the setting operation, and the second driving member for a second blade is locked to the locking member for a second blade before the second blade is made to start an exposure operation, and rotates while pushing the first driving member for a second blade by the urging force of the driving spring for a second blade against the urging force of the setting spring when the lock to the locking member for a second blade is released. If so, the storage space for the second blade in the setting state becomes small, and the dimensions of the first blade and the second blade in an operation direction can be made small as the overall shutter.

Additionally, the second blade includes two arms pivotally attached to the shutter ground plate, and a plurality of substantially strip-shaped blades pivotally supported on the arms in order in a length direction, the blades are adapted to withdraw into an overlap state from an exposure opening in the state immediately before the start of an exposure operation, the intermediate plate has an arc shape such that the contour line of a region which overlaps the plurality of blades in an overlap state becomes convex toward the exposure opening, and the plurality of blades are formed such that the overlap therebetween becomes small, substantially at central portions of the blades in the length direction. If so, the contact area with the intermediate plate is made small, the exposure operation of the second blade can be smoothly performed, and the interval between the shutter ground plate and the auxiliary ground plate can also be made small.

Moreover, the holding means, to which a pressing member having two pressing portions is rotatably attached within a predetermined angle of rotation, pushes the two unlocking means against the urging forces of the two release springs using the two pressing portions when being operated so as to interlock with the setting operation of the setting member, is locked to a release member in a state where the two unlocking means are brought into contact with the two iron core members, and is operated out of the two operation loci of the two unlocking means by the urging force of the release spring if the lock of the release member is released, and wherein at least one pressing portion of the pressing member is allowed to abut on a shock-absorbing member attached to a member integral with the shutter ground plate at the time of the stop of operation by the urging force of the release spring. If so, since the still state of the holding means is obtained early, the time until the first blade starts an exposure operation after the release button of the camera is pushed can be shortened.

In a locking type focal plane shutter for a digital camera including two shutter blades, an electric current is not applied to the coil of the electromagnet for a second blade in the case where the deterring means is operated in the operation locus of the unlocking means for a second blade by the electromagnetic device, and the unlocking means for a second blade which performs a separation operation from the iron core member of the electromagnet for a second blade so as to follow the holding means is deterred by the deterring means before the lock of the driving member for a second blade by the locking member for a second blade. If such a configuration is adopted, the invention has the features that a photographer can select and perform the photographing in the photographing mode using an optical finder and the photographing in the photographing mode using a monitor adapted such that the imaging device for a monitor is used also as an imaging device for photographing is selected before photographing.

BEST MODE FOR CARRYING OUT THE INVENTION

The embodiment of the invention will be described by way of an illustrated example. In addition, the locking type focal plane shutter for a digital camera of the present example is able to select whether photographing is performed using an optical finder by manipulating switching means provided at the camera before photographing is performed, or whether photographing is performed using a monitor. In the case where photographing is performed using an optical finder, photographing of a still image is performed in a mode adapted such that photographing exposure is started as a first blade begins to open an exposure opening and photographing exposure is ended as a second blade finishes closing the exposure opening. In the case where photographing is performed using a monitor, it is possible to perform photographing of a still image in a mode adapted such that photographing is started as an electronic control circuit controls an imaging device and photographing is ended as the second blade closes the exposure opening, and photographing of a moving image in a mode in which a release button separate from the case where photographing of the still image is performed is pushed whereby the electronic control circuit repeats a predetermined operation while the release button is pushed.

Embodiment

Figure 1:
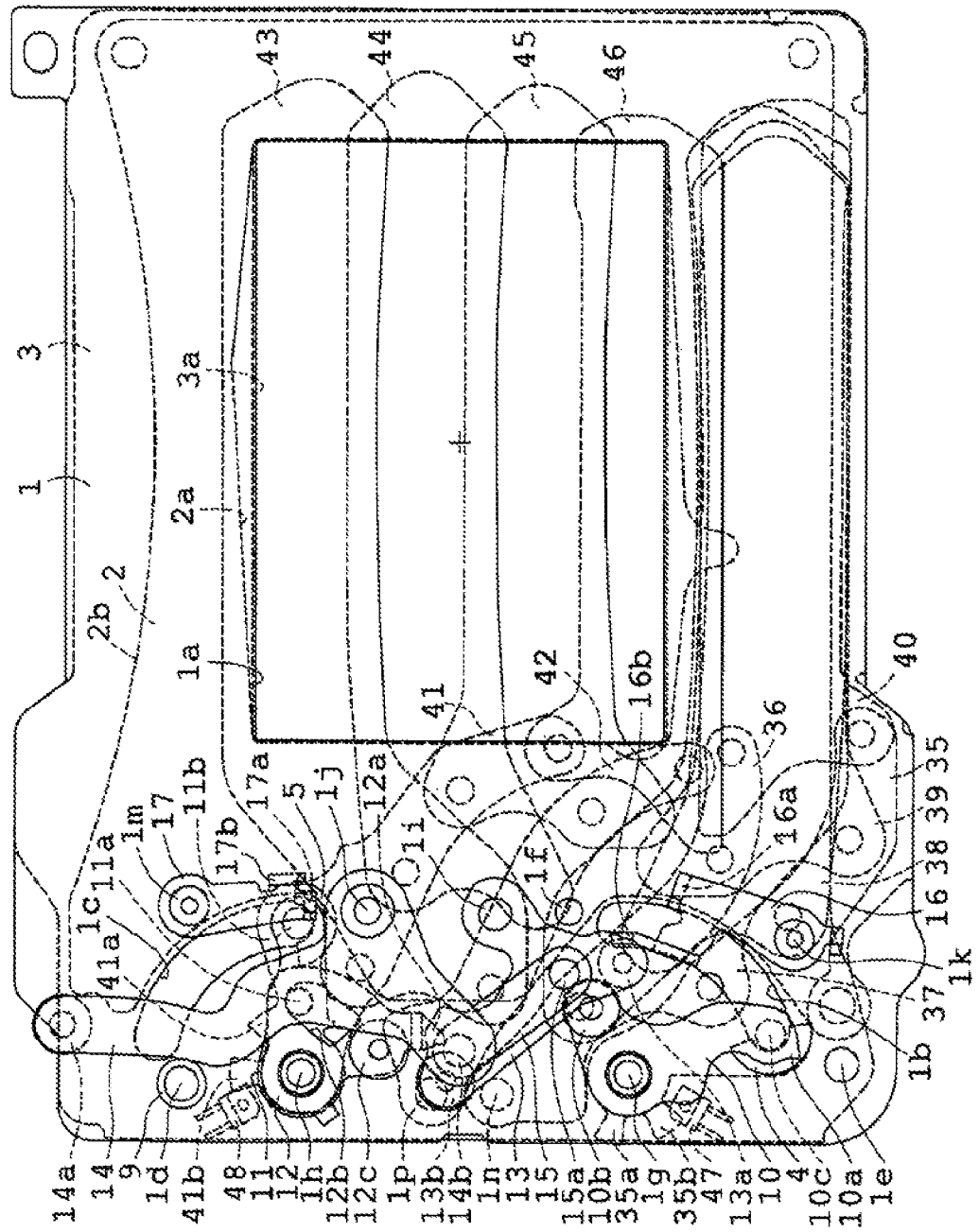
FIG. 1 is a plan view showing a state immediately after the end of an exposure operation, and mainly showing only constituent members of an opening and closing driving mechanism arranged near a shutter ground plate with respect to a control mechanism of shutter blades.
Figure 2:
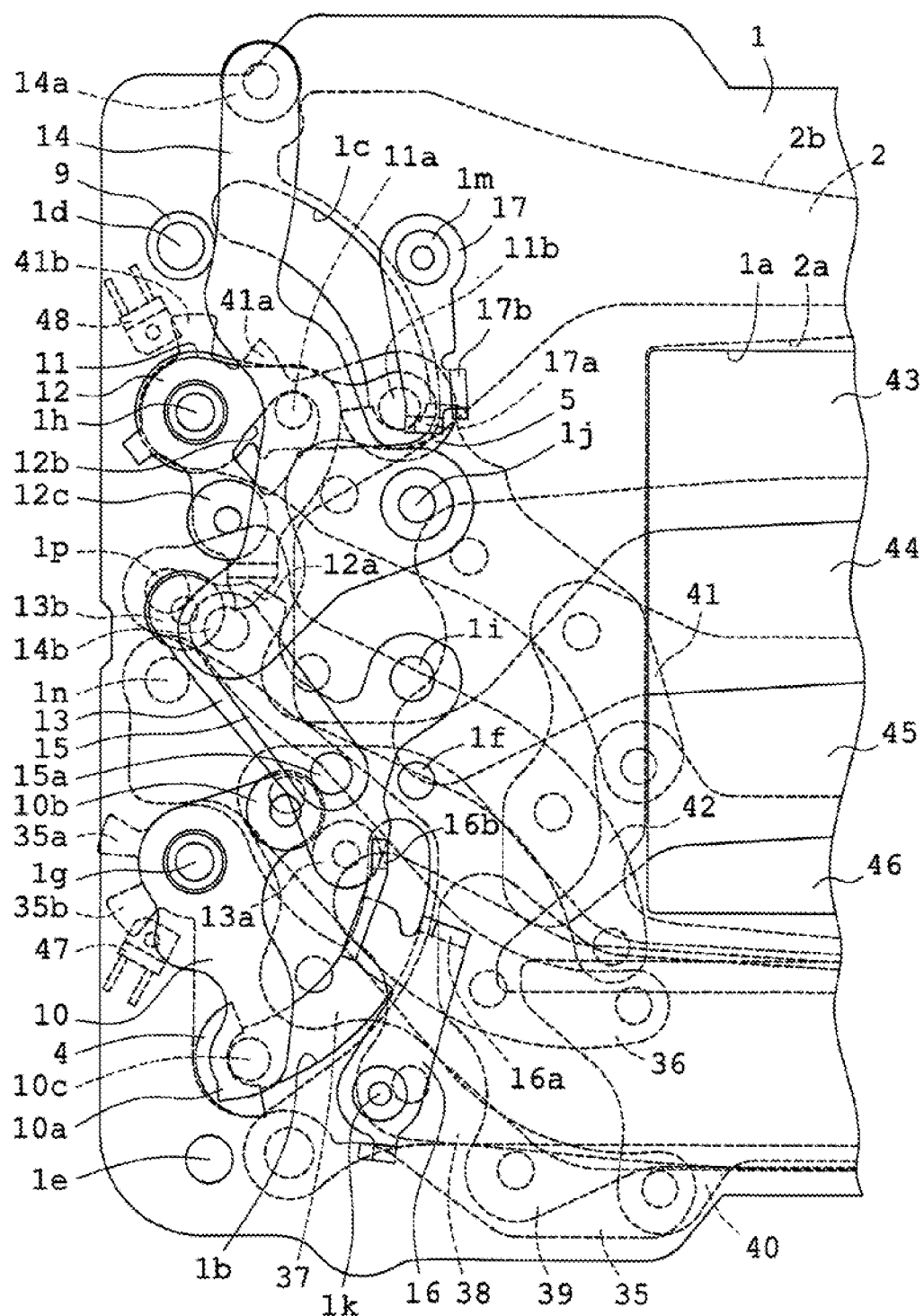
FIG. 2 is an enlarged plan view showing only approximately a left half in FIG. 1.
Figure 3:
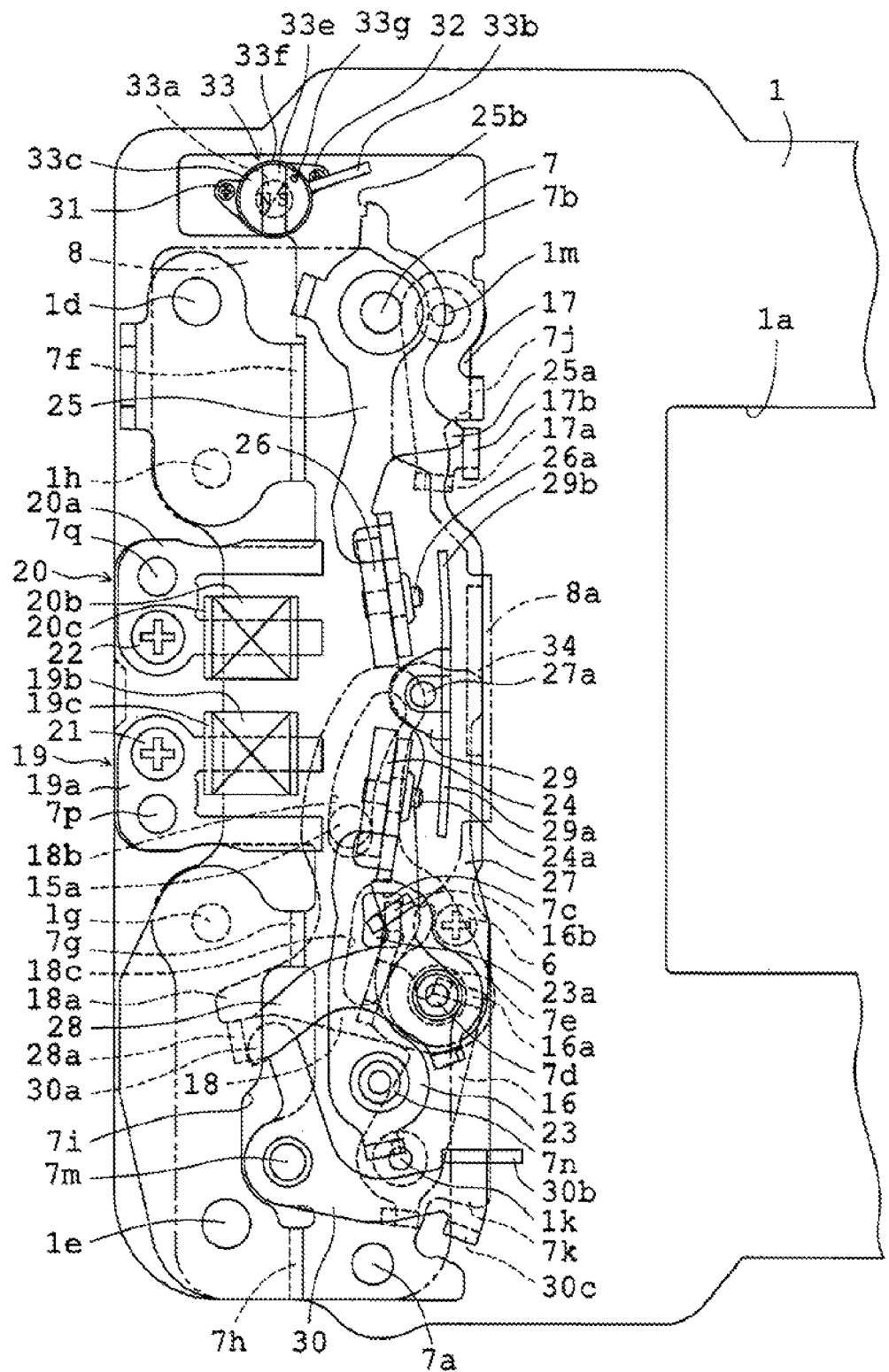
FIG. 3 is a plan view showing a state immediately after the end of an exposure operation, and mainly showing constituent members of an unlocking mechanism arranged in a place apart from the shutter ground plate more than the opening and closing driving mechanism shown in FIG. 2 so as to overlap the opening and closing driving mechanism.
Figure 4:
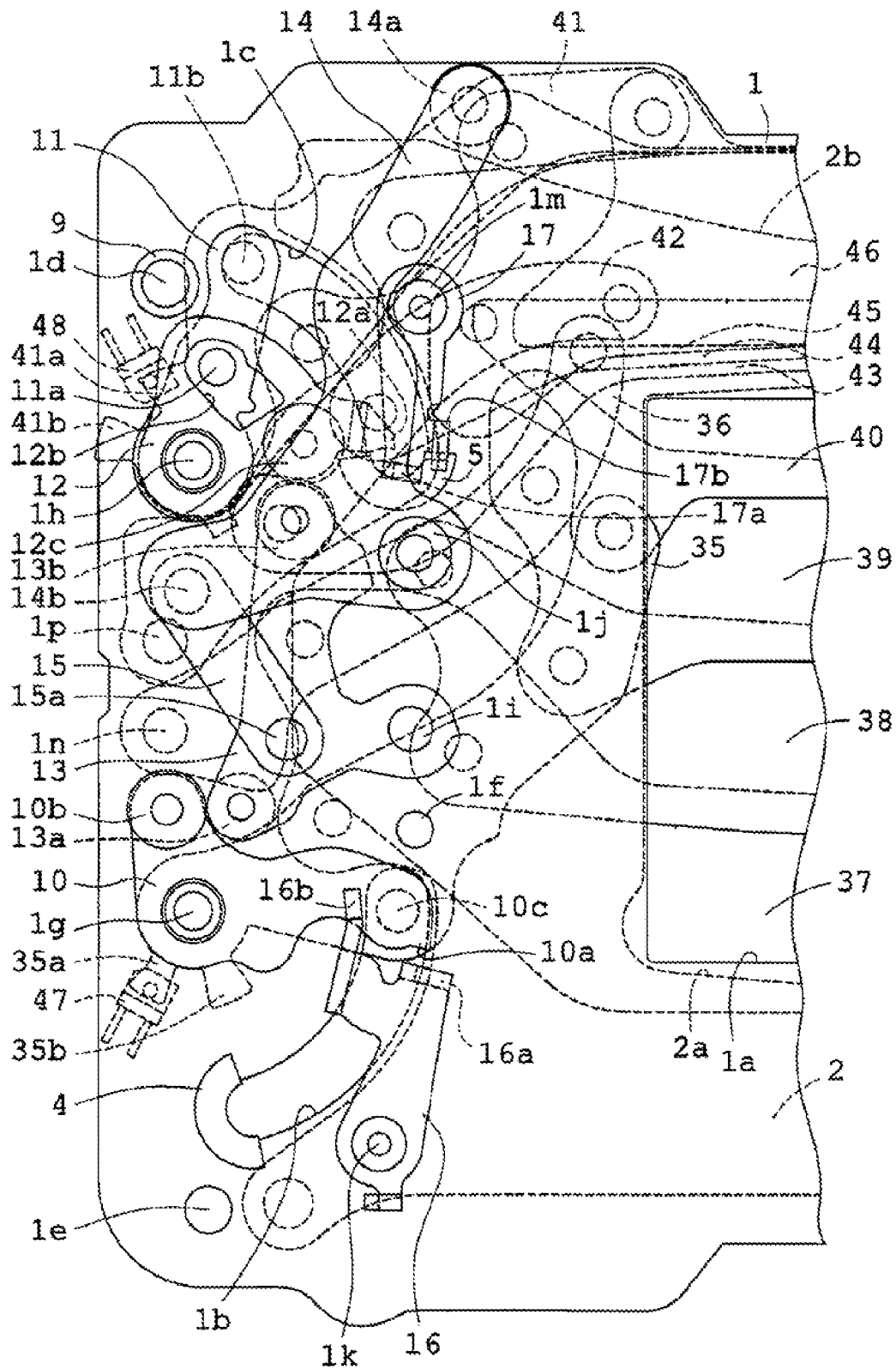
FIG. 4 is a plan view showing an oversetting state of the opening and closing driving mechanism shown in FIG. 2.

First, the configuration of the first embodiment will mainly be described with reference to FIGS. 1 to 4. All of FIGS. 1, 3 and 4 are plan views showing a state immediately after the end of an exposure operation. FIG. 1 also shows the configuration of shutter blades arranged on the rear surface side of a shutter base plate by broken lines. However, FIG. 1 shows only components of an opening and closing drive mechanism arranged near the shutter base plate with respect to a control mechanism of a shutter blade including the opening and closing drive mechanism and an unlocking mechanism and arranged at the front surface side (near side) of the shutter base plate. FIG. 2 is an enlarged plan view showing only approximately a left half in FIG. 1. Moreover FIG. 3 shows components of the unlocking mechanism arranged in a place apart from the shutter base plate more than the opening and closing drive mechanism so as to overlap the opening and closing drive mechanism shown in FIG. 2. Therefore, a portion of the configuration shown in FIG. 2 is also shown in FIG. 3.

In FIG. 1, the shutter base plate 1 forms an opening portion 1a at a substantially central portion thereof. An intermediate plate 2 and an auxiliary base plate 3 are attached to the rear surface side of the shutter base plate 1 in order with a predetermined interval therebetween, a blade chamber of the first blade to be described below is formed between the shutter base plate 1 and the intermediate plate 2, and a blade chamber of a second blade to be described below is formed between the intermediate plate 2 and the auxiliary base plate 3. An opening portion 2a having a peculiar shape is also formed in the place of the intermediate plate 2 which overlaps the opening portion 1a, and an oblong opening portion 3a which slightly larger than the opening portion 1a is also formed in the place of the auxiliary base plate 3 which overlap with the opening 1a. Usually, an exposure opening (an opening which allows subject light to pass therethrough as a shutter) having a laterally long oblong shape is formed by one of the openings 1a, 2a, and 3a, or is formed by the synthesis of two or more of the openings. However, in the case of the first embodiment, the exposure opening may be formed only by the opening portion 1a.

The intermediate plate 2 of the first embodiment is attached to the shutter base plate 1 by attachment holes (with no reference numerals) formed in at three places including an upper right corner, a lower left corner, and a lower right corner. The shape of a contour forming edge which becomes the left of the opening portion 2a is formed in a complicated shape so as to avoid the operation loci of two driving pins to be described below as is well known. As for the intermediate plate 2, the shape of a contour forming edge 2b which becomes an upper portion of the opening portion 2a is formed in the shape of an arc which is convex toward the opening portion 2a side, that is, toward the opening portion 1a side in the first embodiment. The reason will be described in the description of the operation to be described below. The contour of the auxiliary base plate 3 is almost the same as the shutter base plate 1, but is formed smaller than the shutter base plate, and is attached to the shutter base plate 1 at one place of the upper left corner (not shown) besides at the same three places as in the case of the intermediate plate 2. Illustration of the contour of the auxiliary base plate 3 shown in FIG. 1 is omitted in FIG. 2.

As shown in FIGS. 1 and 2, two arc-like long holes 1b and 1c are formed in a left region of the opening portion 1a in the shutter base plate 1, and shock-absorbing members 4 and 5 made of rubber which are substantially C-shaped in plan view are attached to lower ends of these long holes as is well known. Three columns 1d, 1e, and 1f are erected from the left region of the opening portion 1a in the shutter base plate 1. The column 1f among these columns attaches an upper base plate 7 shown in FIG. 3 by tighten a screw 6 shown in FIG. 3 on a screw hole (not shown) which is formed at the tip of the column. The columns 1d and 1e attach a cover plate 8 (whose contour is shown by a two-dotted chain line) at a predetermined interval from the upper base plate 7 by tighten screws (not shown) on screw holes (not shown) at the tips of the columns along with the column 7a and a shaft 7b which are erected from the upper base plate 7 as shown in FIG. 4, in addition to attaching the upper base plate 7 on the midway in the length direction.

Next, before describing components arranged between the shutter base plate 1 and the upper base plate 7 mainly with reference to FIG. 2, a shaft member erected from the shutter base plate 1 in order to attach the members will be described. Six shafts 1g, 1h, 1i, 1j, 1k and 1m are erected toward the upper base plate 7 from the shutter base plate 1. The shafts 1g and 1h among these shafts have shaft portions passed through the shutter base plate 1 and also erected from the rear surface side thereof, and rotatably attach two arms of the first blade and two arms of the second blade which will be described below, along with the shafts 1n and 1p erected from the rear surface side of the shutter base plate 1, respectively. The shafts 1k and 1m also function to fit smaller-diameter portions formed at the tips of the shafts into holes formed in the upper base plate 7, and also support the upper base plate 7 with a ring-shaped stepped end surface formed between the smaller-diameter portions.

Thus, first, the ring-shaped shock-absorbing member 9 is attached to the column 1d of the shutter base plate 1. A driving member 10 for a first blade is rotatably attached to the shaft portion of the shaft 1g erected from the upper base plate 7 side, and is urged by a driving spring for a first blade (not shown) so as to rotate in a clockwise direction. The driving member 10 for a first blade includes a locked portion 10a, includes a roller 10b rotatably attached to the surface thereof on the upper base plate 7 side, and includes the driving pin 10c on the shutter base plate 1 side. The driving pin 10c is passed through the long hole 1b of the shutter base plate 1, includes a proximal portion adapted to be able to abut on the shock-absorbing member 4, and includes a distal portion linked to the first blade in the blade chamber. The configuration of the first blade will be described below.

A first driving member 11 for a second blade and a second driving member 12 for a second blade are rotatably attached to the shaft portion of the shaft 1h the shutter base plate 1 which is erected from the upper base plate 7 side such that the first driving member 11 for a second blade is located on the shutter base plate 1 side. The first driving member 11 for a second blade includes a columnar engaging portion 11a on the upper base plate 7 side, and includes a driving pin 11b on the shutter base plate 1 side. The driving pin 11b is passed through the long hole 1c of the shutter base plate 1, includes a proximal portion adapted to be able to abut on the shock-absorbing member 5, and includes a distal portion linked to the second blade in the blade chamber. The configuration of the second blade will be described below.

The second driving member 12 for a second blade includes a locked portion 12a and a window portion 12b which allows the engaging portion 11a to be inserted thereinto, and includes a roller 12c rotatably attached to the upper base plate 7 side. The second driving member 12 for a second blade is urged by a driving spring for a second blade (not shown) so as to rotate in the clockwise direction. In the case of the first embodiment, a setting spring (not shown) is hung between the second driving member 12 for a second blade and the first driving member 11 for a second blade so as to perform urging such that the second driving member 12 for a second blade is rotated in the clockwise direction and the first driving member 11 for a second blade is rotated in the counterclockwise direction. However, in the state of FIGS. 1 and 2, the engaging portion 11a of the first driving member 11 for a second blade comes into contact with the edge of the window portion 12b of the second driving member 12 for a second blade. Thus, the urging force is not exerted. As is well known, the setting spring is formed by two springs, one spring may impel the second driving member 12 for a second blade so as to rotate the second driving member for a second blade in the clockwise direction, and the other spring may impel the first driving member 11 for a second blade so as to rotate the first driving member for a second blade in the counterclockwise direction.

A setting member 13 is rotatably attached to the shaft 1i of the shutter base plate 1, and is urged by a spring (not shown) so as to rotate in the counterclockwise direction with the spring (not shown). A roller 13a which can come into contact with the roller 10b of the above-described driving member 10 for a first blade, and a roller 13b which can come into contact with the roller 12c of the above-described second driving member 12 for a second blade are rotatably attached to the surface of the setting member 13 on the shutter base plate 1 side.

A setting manipulating member 14 is rotatably attached to the shaft 1j of the shutter base plate 1. This setting manipulating member 14 includes a roller 14a manipulated by a member on the side of a camera body, and includes a shaft 14b erected from the surface thereof on the shutter base plate 1 side. The setting manipulating member 14 is linked to the setting member 13 via a link member 15. That is, a hole is formed at one end of the link member 15, and the shaft 14b of the setting manipulating member 14 rotatably fits into the hole. A pin 15 is provided on the upper base plate 7 side at the other end of the link member 14, and a shaft is erected from the shutter blade 1 side so as to become coaxial with a pin 15a of the link member. The shaft rotatably fits into a hole formed in the setting member 13.

Therefore, in FIG. 1, the setting manipulating member 14 is rotated in the counterclockwise direction via the link member 15 along with the rotation of the setting member 13 in the counterclockwise direction by the urging force of a spring (not shown), and is brought into the state of having stopped the shock-absorbing member 9 as a stopper. The setting manipulating member 14 is provided to rotate the setting member 13 in the clockwise direction via the link member 15 when the roller 14a is pushed and rotated in the clockwise direction by the member on the side of a camera body during a setting operation. However, the setting member 13 may be rotated in the clockwise direction directly by the member on the side of a camera body directly during a setting operation, without including such a setting manipulating member 14. However, since the link member 15 also becomes unnecessary in that case, as can be understood from the following description, it is necessary to provide a pin replacing the above pin 15a in the setting member 13.

A locking member 16 for a first blade is rotatably attached to the shaft 1k of the shutter base plate 1, and is urged by a spring (not shown) so as to rotate in the counterclockwise direction. Although the locking member 16 for a first blade includes a locking portion 16a which is bent to the shutter base plate 1 side, the locking portion 16a locks the locked portion 10a of the driving member 10 for a first blade to prevent the rotation of the driving member 10 for a first blade in the clockwise direction. The locking member 16 for a first blade includes a pushed portion 16b made to further protrude to the upper base plate 7 side, at an upper end of the bent portion which is bent to the upper base plate 7 side. The tip of the pushed portion 16b is present between the upper base plate 7 and the cover plate 8 by inserting the pushed portion 16b into a substantially oblong hole 7c (refer to FIG. 3) of the upper base plate 7.

A locking member 17 for a second blade is rotatably attached to the shaft 1m of the shutter base plate 1, and is urged by a spring (not shown) so as to rotate in the clockwise direction. The lock member 17 for a second blade includes a locking portion 17a which is bent to the shutter base plate 1 side, and a pushed portion 17b which is bent to the upper base plate 7 side. The locking portion 17a of these portions is provided to lock the locked portion 12a of the second driving member 12 for a second blade to prevent the rotation of the driving member 12 for a second blade in the clockwise direction. The tip of the pushed portion 17b, as shown in FIG. 3, is made to be present between the upper base plate 7 and the cover plate 8 on the lateral side of the upper base plate 7 and the cover plate 8.

As shown in FIG. 3, although the shaft 7d is erected toward the cover plate 8 side from the upper base plate 7, the shaft 7e is erected toward the shutter base plate 1 side concentrically with the shaft 7d, and the auxiliary setting member 18 is rotatably attached to the axis 7e. A spring is not hung on the auxiliary setting member 18. The auxiliary setting member 18 includes a pushing portion 18a, an arc-like long hole 18b, and a large relief hole 18c, and the pin 15a of the above-described link member 15 is inserted into the long hole 18b. Therefore, the auxiliary setting member 18 rotates in the counterclockwise direction if the setting member 13 rotates in the clockwise direction, and then rotates in the clockwise direction if the setting member 13 rotates in the counterclockwise direction. The relief hole 18c has a shape which allows the pushed portion 16b of the locking member 16 for a first blade to pass therethrough and be inserted into the hole 7c of the upper base plate 7 and which does not interfere with the pushed portion 16b during operation. Although the pin 15a of the link member 15 is shown in FIG. 3, the illustration thereof is omitted in FIGS. 6-8 referred to in the description of operation.

Next, although components arranged between the shutter base plate 7 and the cover plate 8 will be described mainly with reference to FIG. 3, the overall shape of the upper base plate 7, and a shaft member or the like erected toward the cover plate 8 from the upper ground 7 in order to attach the components will be described prior to this description. First, although the upper base plate 7 has a shape which is long in the up-and-down direction as a whole as is shown by a solid line in FIG. 3, a right half is formed as same plane region, whereas a left half is formed to as four overhang regions which overhang to the left from the right-half region.

The first and third overhang regions from above are formed so as to become flush with the right-half region, whereas the two remaining overhang regions are stepped by the bent portions 7f, 7g, and 7h, and are formed so as to become high toward the cover plate 8 side. An elongate window portion 7i which has a special shape is formed between the two bent portions 7g and 7h. Moreover, although a bent portion 7j is formed at an upper right portion of such a upper base plate 7, and an abutted portion 7k is formed at a lower right portion, the bent portion 7j is bent to the shutter base plate 1 side so as to function as a stopper when the locking member 17 for a second blade is rotated in the counterclockwise direction.

Two shafts 7m and 7n are erected toward the cover plate 8 from the upper base plate 7 having such a shape, in addition to the shafts 7b and 7d which are already described. The shafts 7d and 7n among these shafts fit smaller-diameter portions formed at the tips thereof into holes formed in the cover plate 8, and support the cover plate with a ring-shaped stepped end surface formed between the smaller-diameter portions. Two locating pins 7p and 7q are erected toward the cover plate 8 side by the third overhang region of the upper base plate 7 from above.

Next, components attached to such an upper base plate 7 will be described. First, an electromagnet 19 for a first blade and an electromagnet 20 for a second blade fit holes formed in iron core members 19a and 20a to the locating pins 7p and 7q, and are then attached to the upper base plate 7 with screws 21 and 22. The electromagnets 19 and 20 include the iron core members 19a and 20a which have a U-shape and have tips of two respective legs as magnetic pole portions, and bobbins 19c and 20c which have coils 19b and 20b wound therearound, and are fitted on one leg of each of the iron core members 19a and 20a. Therefore, the legs of the iron core members 19a and 20a are floated without touching the surface of the upper base plate 7.

An unlocking member 23 for a first blade is rotatably attached to the shaft 7n of the upper base plate 7, and is urged by a release spring for a first blade (not shown) so as to rotate in the clockwise direction. The unlocking member 23 for a first blade includes a pushing portion 23a which pushes the pushed portion 16b of the lock member 16 for a first blade, and an iron piece member 24 is attached to a bent portion formed at the upper tip of the unlocking member as is well known. A pushed portion 24a is provided at the iron piece member 24 so as to protrude to the right of the bent portion thereof.

An unlocking member 25 for a second blade is rotatably attached to the shaft 7b of the upper base plate 7, and is urged by a release spring for a second blade (not shown) so as to rotate in the counterclockwise direction. The unlocking member 25 for a second blade includes a pushing portion 25a which pushes the pushed portion 17b of the lock member 17 for a second blade, and a deterred portion 25b. An iron piece member 26 is attached to a bent portion formed at the lower tip of the unlocking member. A pushed portion 26a is provided at the iron piece member 26 so as to protrude to the right of the bent portion thereof.

A hold member 27 and a hold auxiliary member 28 are separately attached rotatably to the shaft 7d of the upper base plate 7. The hold member 27 is arranged closer to the upper base plate 7 side than the unlocking member 23 for a first blade, and the hold auxiliary member 28 is arranged closer to the cover plate 8 side than the unlocking member 23 for a first blade. The hold member 27 is urged by a first spring (not shown) so as to rotate in the clockwise direction. A second spring (not shown) which urges the hold member 27 so as to rotate the hold member in the counterclockwise direction and urges the hold auxiliary member 28 so as to rotate the hold auxiliary member in the clockwise direction is hung between the hold member 27 and the hold auxiliary member 28. In FIG. 3, the relative relationship between the hold member 27 and the hold auxiliary member 28 is brought into a limit state which can be rotated in mutually different directions by the urging force of the second spring, and both the hold member and the hold auxiliary member are rotated together in the clockwise direction and stopped by the urging force of the first spring.

Therefore, if the hold auxiliary member 28 is rotated in the counterclockwise direction in the state of FIG. 3, the hold member 27 is also rotated together in the counterclockwise direction together against the urging force of the first spring. Thereafter, if the force which rotates the hold auxiliary member 28 in the counterclockwise direction is lost, both the hold member and the hold auxiliary member are rotated together by the urging force of the first spring in the clockwise direction. However, only in a case where the hold member 27 and the hold auxiliary member 28 are rotated together in the counterclockwise direction together and the rotation of the hold member 27 is prevented, only the hold auxiliary member 28 can slightly continue its rotation in the counterclockwise direction while tensioning the second spring. Such a configuration between both the hold member and the hold auxiliary member is well known, and one example of a specific configuration is described in, for example, JP-A-2007-34042.

A shaft 27a is erected from the tip of the hold member 27, and a well-known pressing member 29 is attached to the shaft 27a. The pressing member 29 includes two pressing portions 29a and 29b which are formed so as to stretch in the up-and-down direction of FIG. 3, and these pressing portions can push pushed portions 24a and 26a of the iron piece members 24 and 26, and can push the iron piece members 24 and 26 to the iron core members 19a and 20a. Since the pressing member 29 can reliably press the two iron piece members 24 and 26 to the iron core members 19a and 20a, this pressing member is adapted to be able to rotate at a predetermined angle with respect to the shaft 27a through a well-known configuration. On the other hand, the hold auxiliary member 28 includes a tip arranged on the rear surface side of the upper base plate 7 through the window portion 7i, and the pressed portion 28a bent to the shutter base plate 1 side is adapted to push the pushing portion 18a of the auxiliary setting member 18.

A release member 30 is rotatably attached to the shaft 7m of the shutter base plate 7, and is urged by a spring (not shown) so as to rotate in the counterclockwise direction. The release member 30 includes a locking portion 30a at the tip of one arm portion, includes a pushed portion 30b and an abutting portion 30c at the tip of the other arm portion, and is arranged closer to the upper base plate 7 side than the hold auxiliary member 28. The locking portion 30a passes through the window portion 7i so as to be able to lock the pushed portion 28a of the hold auxiliary member 28 on the rear surface side of the upper base plate 7, and prevent the rotation of the hold auxiliary member 28 in the clockwise direction. The pushed portion 30b is a portion which is pushed by the member (not shown) on the side of a camera body, and the abutting portion 30c is a portion which abuts on the abutted portion 7k formed at the upper base plate 7 and is stopped, when the release member 30 is rotated in the counterclockwise direction by the urging force of a spring (not shown).

An electromagnetic device 33 is attached to the face of the upper ground plate 7 on the cover plate 8 side with two screws 31 and 32. The electromagnetic device 33 of the present example is obtained by modifying the configuration of a well-known current-control-type actuator described in JP-A-2005-173132 or the like, and integrating the deterring member 33b with the permanent magnet rotor 33a. That is, in the electromagnetic actuator described in the above publication, an output pin for reciprocally rotating the shutter blade is formed integrally with the permanent magnet rotor so as to become parallel to a rotating shaft of the permanent magnet rotor. In contrast, in the electromagnetic device 33 of the present example, the rod-shaped deterring member 33b made of synthetic resin is integrated with the permanent magnet rotor 33a so as to be perpendicular to the rotating shaft thereof so that the unlocking member 25 for a second blade can be deterred from rotating in the counterclockwise direction.

Since the current control type actuator described in the above patent laid-open publication drives the shutter blades, a diaphragm blade, or the like by the output pin thereof, the current control type actuator is literally an actuator. However, since the electromagnetic device 33 of the present example only has the permanent magnet rotor 33a, and deters the rotation of the unlocking member 25 for a second blade a the deterring member 33b, this electromagnetic device cannot be said to be actuator. Thus, although the configuration of the electromagnetic device 33 other than deterring member 33b is substantially well-known, the configuration of the electromagnetic device will be quickly and simply described.

First, a first stator frame 33c has a cylindrical cup shape with a closed one end, and is closed by a plate-shaped second stator frame at the other end 33d so as to constitute an accommodation chamber of the permanent magnet rotor 33a magnetized to two poles in the radial direction together with the second stator frame 33d. Additionally, the stator frames 33c and 33d bring the permanent magnet rotor 33a into a bearing state in the accommodation chamber, and are mutually integrated by winding the coil 33e around the outside of the accommodation chamber so as to surround both bearing portions. The two screws 31 and 32 threadedly attach the second stator frame 33d to the upper ground plate 7.

A cylindrical yoke 33f is fitted to the outside of the first stator frame 33c so as to surround the coil 33e. Additionally, although not shown clearly, a window is formed in a portion of the first stator frame 33c in the radial direction, and the deterring member 33b protrudes to the outside from the window, and is reciprocated by the rotation of the permanent magnet rotor 33a. The rotation operating range is regulated by two stoppers (not shown). An iron pin (magnetic rod) 33g is attached to a first stator frame 33c so as to become parallel a rotating shaft of the permanent magnet rotor 33a. In addition, although only one iron pin (magnetic rod) 33g is provided in the present example, it is known that two or more iron pins (four in the above patent laid-open publication) are provided.

Moreover, the operation method and functions of such an electromagnetic device 33 will also be simply described here. The permanent magnet rotor 33a is rotated in the clockwise direction if an electric current is applied to the coil 33e in a forward direction, and is stopped as the deterring member 33b abuts on a stopper (not shown). However, the permanent magnet rotor is rotated in a counterclockwise direction if an electric current is applied to the coil 33e in a reverse direction after that, and is stopped as the deterring member 33b abuts on a stopper (not shown). When the deterring member 33b comes into contact with one of the stoppers, a rotative force is given to the permanent magnet rotor 33a by the magnetic force of the permanent magnet rotor 33a which acts between the permanent magnet rotor 33a and the iron pin (magnetic rod) 33g even if the electric current to the coil 33e is cut off. Thus, the contact state between the deterring member 33b and the stopper is maintained by the rotative force.

Another member is arranged between the upper ground plate 7 and the cover plate 8. That is, in the cover plate 8, a bent portion 8a is formed in an elongated fashion in the up-and-down direction toward the upper ground plate 7 side at a central right end of FIG. 3, and a shock-absorbing member 34 (shown by a broken line for convenience) made of rubber which has an elongated rectangular parallelepiped is attached to the left of the bent portion 8a with an adhesive. Although FIG. 3 shows that the shock-absorbing member 34 partially overlaps the hold member 27, in practice, the shock-absorbing member is attached to the bent portion 8a in a place near the cover plate 8 side. Thus, the shock-absorbing member does not affect the operation of the hold member 27, and is arranged so that only the pressing portions 29a and 29b of the pressing member 29 attached to the hold member 27 can abut thereon.

Next, constituent members arranged on the rear surface side of the shutter ground plate 1 in addition to the intermediate plate 2 and the auxiliary ground plate 3 which have already been described will be described with reference to FIGS. 1 and 2. First, the first blade arranged between the shutter ground plate 1 and the intermediate plate 2 includes two arms 35 and 36 one end of each of which is pivotally attached to each of two shafts 1g and 1n erected from the shutter ground plate 1, and four blades 37, 38, 39, and 40 which are pivotally supported in order toward free ends of the arms, and the blade 40 pivotally supported on the foremost end among the blades is used as a slit forming blade. The arm 35 fits a driving pin 10c of the driving member 10 for a first blade into a well-known hole, and forms two light-shielding portions 35a and 35b near a pivotally attached portion onto the shaft 1g. Additionally, the overlap relationship between the arms 35 and 36 and the blades 37, 38, 39, and 40 is such that the arms 35 and 36 are present closest to the shutter ground plate 1 side, and the blade 37 is present closest to the intermediate plate 2 side.

The second blade arranged between the intermediate plate 2 and the auxiliary ground plate 3 includes two arms 41 and 42 one end of each of which is pivotally attached to each of two shafts 1h and 1p erected from the shutter ground plate 1, and four blades 43, 44, 45, and 46 which are pivotally supported in order toward free ends of the arms, and the blade 46 pivotally supported on the foremost end among the blades is used as a slit forming blade. The arm 41 fits a driving pin 11b of the driving member 11 for a second blade into a well-known hole, and forms two light-shielding portions 41a and 41b near a pivotally attached portion onto the shaft 1h. Additionally, the overlap relationship between the arms 41 and 42 and the blades 43, 44, 45, and 46 is such that the arms 41 and 42 are present closest to the auxiliary ground plate 3 side, and the blade 43 is present closest to the intermediate plate 2 side.

Finally, two photoelectric sensors 47 and 48 which have the same configuration are attached to the vicinities of the shafts 1g and 1h on the rear surface side of the shutter ground plate 1. The photoelectric sensors 47 and 48, generally called photo-interrupters, are configured such that a light-emitting portion and a light-receiving portion are arranged to face each other, and the light emitted from the light-emitting portion is received by the light-receiving portion, and are adapted to output a H (High) signal when the light-receiving portion receives light, and output an L (Low) signal when the light-receiving portion does not receive light. In the case of the present example, the light-shielding portions 35a and 35b of the arm 35 are adapted to be able to cut off an optical path of the photoelectric sensor 47, and the light-shielding portions 41a and 41b of the arm 41 are adapted to be able to cut off an optical path of the photoelectric sensor 48.

Next, although the operation of the present example is described, as described above, the present example is able to select whether photographing is performed using an optical finder by manipulating to switch selecting means provided at the camera, or whether photographing is performed using a monitor. In the case where photographing is performed using an optical finder, photographing of a still image is allowed. In the case where photographing is performed using a monitor, photographing of a still image and photographing of a moving image can be selected and performed by pushing a separate release button (release switch). Therefore, in the case of a digital camera into which the focal plane shutter of the present example is assembled, the selecting means (switch) whether photographing is performed using an optical finder or whether photographing is performed using a monitor, the release button for still image photographing, and the release button for moving image photographing are provided.

FIGS. 1 to 3, as already described, show a state immediately after the end of an exposure operation, that is, a state immediately after the end of photographing. In the present example, this state is brought about immediately after the end of photographing in both the case where the photographing is performed using an optical finder and in the case where photographing is performed using a monitor. At this time, the setting member 13 shown in FIGS. 1 and 2 is urged by the urging force of a spring (not shown) so as to rotate in the counterclockwise direction. However, as the setting manipulating member 14 interlocked with the setting member 13 comes into contact with the shock-absorbing member 9, this stop state is maintained. Hereinafter, as for the setting member 13, this stop position is referred to as an initial position.

Additionally at this time, the driving member 10 for a first blade and the first driving member 11 for a second blade cause the driving pins 10c and 11b thereof to abut on the shock-absorbing members 4 and 5, and the rotation thereof in the clockwise direction is stopped. Thereby, the four blades 37 to 40 of the first blade is brought into the overlap state where the mutual overlap amount thereof is maximized, and is stored in a lower region of the opening portion 1a, and the four blades 43 to 46 of the second blade is brought into a developed state where the mutual overlap amount thereof is minimized, so as to close the opening portion 1a. Additionally, at this time, the hold member 27 and the hold auxiliary member 28 are urged by the first spring (not shown) so as to rotate in the clockwise direction. However, as shown in FIG. 3, the rotation of the pushed portion 28a of the hold auxiliary member 28 is prevented by coming into contact with the pushing portion 18a of the auxiliary setting member 18.

Additionally, at this time, the unlocking member 23 for a first blade is rotated in the clockwise direction by the urging force of a release spring (not shown) for a first blade, causes the iron piece member 24 to separate from the iron core member 19a of the electromagnet 19 for a first blade, and is stopped in a state where the pushing portion 23a pushes the pushed portion 16b of the locking member 16 for a first blade against the edge of the hole 7c of the upper ground plate 7. Additionally, the unlocking member 25 for a second blade is rotated in the counterclockwise direction by the urging force of the release spring (not shown) for a second blade, causes the iron piece member 26 to separate from the iron core member 20a of the electromagnet 20 for a second blade, and is stopped in a state where the pushing portion 25a pushes the pushed portion 17b of the locking member 17 for a second blade and pushes the locking member 17 for a second blade against the bent portion 7j of the upper ground plate 7.

Moreover, the rotor 33a of the electromagnetic device 33 is rotated in the counterclockwise direction to maintain a state where the deterring member 33b abuts on and is stopped by the stopper (not shown). In this state, an electric current is not applied to the coils 19c and 20c of the two electromagnets 19 and 20, and the coil 33e of the electromagnetic device 33.

If the exposure operation of the first blade and the second blade is completed and is brought into such a state, a setting operation is performed immediately after imaging information is transmitted via an image processing circuit from an imaging device and is stored in a storage device. In the case of the present example, the setting operation is started such that the setting manipulating member 14 pushes a roller 14a by means of a member (not shown) on the side of a camera body to rotate the roller in the clockwise direction. However, the completion state of the setting operation, that is, the photographing standby state is different when the selecting means provided at the camera selects the photographing mode using an optical finder and when the selecting means selects the photographing mode using a monitor. Thus, in the following description of operation, a case where the photographing mode using an optical finder is selected will first be described with reference to FIGS. 4 to 9.

As described above, in FIG. 2, if the imaging information is stored in the storage device, the member (not shown) on the side of a camera body pushes the roller 14a to rotate the setting manipulating member 14 in the clockwise direction, and the setting member 13 is rotated in the clockwise direction against the urging force of the spring (not shown). Therefore, on the one hand, the two rollers 13a and 13b of the setting member 13 set the opening and closing drive mechanism; on the other hand the pin 15a of the link member 15 rotates the auxiliary setting member 18 in the counterclockwise direction in FIG. 3, to set the unlocking mechanism. Although those setting operations are performed in parallel, first of all, the setting operation of the opening and closing drive mechanism will be described first.

Thus, first, in FIG. 2, if the setting member 13 starts to rotate in the clockwise direction, the roller 13a first pushes the roller 10b of the driving member 10 for a first blade, and rotates the driving member 10 for a first blade in the counterclockwise direction against the urging force of the driving spring (not shown) for a first blade. Thus, the four blades 34 to 40 of the first blade stored at a lower position of the opening portion 1a is operated upwards with the slit forming blade 40 in the lead while the overlap amount between adjacent blades is made small. If the overlap between the slit forming blade 40 of the first blade and the slit forming blade 46 of the second blade reaches a predetermined amount, since the other roller 13b of the setting member 13 begins to push the roller 12c of the second driving member 12 for a second blade. Therefore, the second driving member 12 for a second blade is rotated in the counterclockwise direction against the urging force of the driving spring (not shown) for a second blade.

As described above, a setting spring (not shown) is hung between the first driving member 11 for a second blade and the second driving member 12 for a second blade so as to perform urging such that the first driving member 11 for a second blade is rotated in the counterclockwise direction and the second driving member 12 for a second blade is rotated in the clockwise direction. Thus, if the second driving member 12 for a second blade is rotated in the counterclockwise direction by the setting member 13 as described above, the first driving member 11 for a second blade is rotated in the counterclockwise direction such that the engaging portion 11a thereof follows the edge of the window portion 12b of the second driving member 12 for a second blade. Therefore, the four blades 43 to 46 of the second blade are operated upwards while the overlap amount between adjacent blades from that point is made small. Thereafter, the first blade and the second blade continue an operation while the overlap amount between slit forming blades is favorably maintained.

If the setting operation is performed in this way, the four blades 37 to 40 of the first blade are brought into a development state so as to cover the opening portion 1a, the four blades 43 to 46 of the second blade are brought into an overlap state so as to become the stage of being stored at the upper position of the opening portion 1a, the driving pin 11b of the first driving member 11 for a second blade abuts on the upper end of the arc-like long hole 1c formed in the shutter base plate 1, and is stopped.

Then, since the driving member 10 for a first blade, and the second driving member 12 for a second blade also continue rotating slightly in the counterclockwise direction from that time on, the four blades 37 to 40 of the first blade also continue upward operation. However, since the four blades 43 to 46 of the second blade remain stopped, a setting spring (not shown) hung between the first driving member 11 for a second blade and the second driving member 12 for a second blade is tensioned. That is, in the case of the first embodiment, even if the second driving member 12 for a second blade rotates further by allowing such an operation, the four blades 40 to 43 of the second blade are not operated upwards any more along with this.

Therefore, since the space of the storage region of the second blade, that is, the distance from the upper end edge of the opening portion 1a to the upper end edge of the shutter base plate 1 becomes short, components (not shown) on the side of a camera body, such as an optical finder, can be installed as advantageously as possible. Accordingly, in a case where it is not necessary to provide such a configuration, the first driving member 11 for a second blade and the second driving member 12 for a second blade may be configured as one member.

In the case of the first embodiment, even after the rotation of the first driving member 11 for a second blade has stopped in this way, the driving member 10 for a first blade and second driving member 12 for a second blade are still rotated in the counterclockwise direction. Thereby, the driving member 10 for a first blade begins to rotate the locking member 16 for a first blade slightly in the clockwise direction against the urging force of the spring (not shown) as the locked portion 10a pushes the locking portion 16a which has already been present within the operation locus of the locked portion 10a in that stage (the reason can be understood from the description of the setting operation of the unlocking mechanism to be described below). Then, if the driving member 10 for a first blade rotates still and the contact is released, the locking member 16 for a first blade is rotated in the counterclockwise direction by the urging force of the spring (not shown), bringing a state where the locking portion 16a can be locked to the locked portion 10a.

On the other hand, in the stage where the locked portion 10a of the driving member 10 for a first blade pushes the locking portion 16a of the locking member 16 for a first blade as described above, the second driving member 12 for a second blade also begins to rotate the locking member 17 for a second blade in the counterclockwise direction against the urging force of the spring (not shown) such that the locked portion 12a pushes the locking portion 17a which has already been present within the operation locus of the locked portion 12a (the reason can be understood from the description of the setting operation of the unlocking mechanism to be described below). Then, if the second driving member 12 for a second blade rotates still and the contact is released, the locking member 17 for a second blade is rotated in the clockwise direction by the urging force of the spring (not shown), bringing a state where the locking portion 17a can be locked to the locked portion 12a. The state at that time is an oversetting state shown in FIG. 4.

If such an oversetting state is brought about, the member (not shown) on the side of a camera body separates from the roller 14a of the setting manipulating member 14. Therefore, the setting member 13 is able to rotate in the counterclockwise direction due to the urging force of the spring (not shown) and returns to its initial position while rotating the setting manipulating member 14 in the counterclockwise direction via the link member 15.

Figure 5:
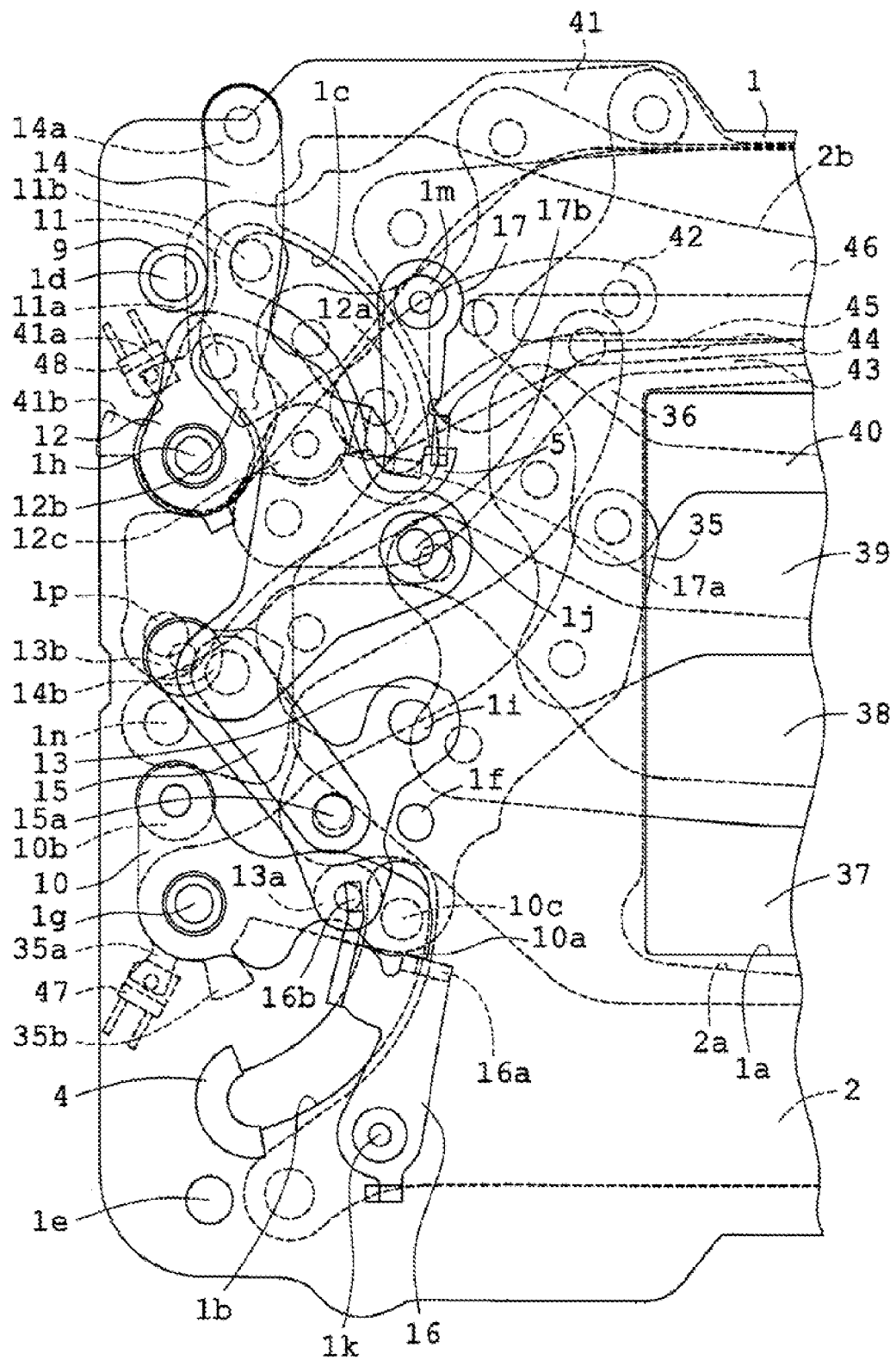
FIG. 5 is a plan view showing a setting completion state of the opening and closing driving mechanism shown in FIG. 2.

On the other hand, since the rollers 13a and 13b of the setting member 13 release the pressing force to the rollers 10b and 12c of the two driving members 10 and 12 through this rotation, the driving members 10 and 12 are rotated in the clockwise direction by the urging force of the driving spring (not shown). However, the locked portions 10a and 12a are locked and stopped by the locking portions 16a and 17a of the respective locking member 16 and 17 in a place where both the driving members have slightly rotated. Although the four blades 37 to 40 of the first blade are operated slightly downward through this slight rotation, a portion of the opening portion 1a is not opened. Thereafter, the setting operation is completed if the setting member 13 stops at the initial position. Incidentally, FIG. 5 shows a setting operation completion state, that is, a photographing standby state for photographing in a photographing mode using an optical finder.

The description of the setting operation of the opening and closing drive mechanism is finished above. Next, a case where the setting member 13 rotates in the clockwise direction against the urging force of the spring (not shown) in FIG. 2 during a setting operation, and the unlocking mechanism is set by the pin 15a of the link member 15. If the setting member 13 rotates in the clockwise direction in FIG. 2, the auxiliary setting member 18 shown in FIG. 3 is pushed by the pin 15a of the link member 15 at the edge thereof in the width direction of the long hole 18b and rotated in the counterclockwise direction, pushes the pressed portion 28a of the hold auxiliary member 28 by means of the pushing portion 18a, and rotates the hold member 27 and the hold auxiliary member 28 in the counterclockwise direction against the urging force of the first spring (not shown).

Thereby, the pressing member 29 attached to the tip of the hold member 27 pushes the pushed portions 24a and 26a of the iron piece members 24 and 26, and 26a by means of the two pressing portions 29a and 29b, and rotates the unlocking member 23 for a first blade in the counterclockwise direction and rotates the unlocking member 25 for a second blade in the clockwise direction, against the urging force of each spring (not shown). Along with the rotation, the pushing portions 23a and 25a of the two unlocking members 23 and 25 release the pressing force to the pushed portion 16b and 17b of the locking member 16 for a first blade and the locking member 17 for a second blade.

As a result, since the locking member 16 for a first blade rotates in the counterclockwise direction and the locking member 17 for a second blade rotates in the clockwise direction, by the urging force of each spring (not shown), as described in the description of the operation of the opening and closing drive mechanism, the locking portions 16a and 17a are present within the operation loci of the locked portions 10a and 12a formed in two driving members 10 and 12. The rotation of the locking members 16 and 17 is stopped as the pushed portions 16b and 17b abut on the edge of the upper base plate 7.

Even after that, if the hold member 27 rotates the unlocking member 23 for a first blade and the unlocking member 25 for a second blade by means of the pressing member 29, the iron piece members 24 and 26 eventually come into contact with the respective iron core members 19a and 20a of the electromagnet 19 for a first blade and the electromagnet 20 for a second blade. Therefore, the rotation of the unlocking member 23 for a first blade and the unlocking member 25 for a second blade stops, and the hold member 27 cannot rotate in the counterclockwise direction. However, since the pushed portion 28a of the hold auxiliary member 28 is pushed by the pushing portion 18a of the auxiliary setting member 18 even after that, the hold auxiliary member 28 stops in a place where the hold auxiliary member has been slightly rotated, while tensioning the second spring (not shown) hung between the hold auxiliary member and the hold member 27.

On the other hand, after the iron piece members 24 and 26 come into contact with the iron core members 19a and 20a as described above, the rotation of a release lever 30 which is prevented by the pushed portion 28a of the hold auxiliary member 28 until then is allowed. As a result, the release lever is rotated in the counterclockwise direction by the urging force of the spring (not shown), and the abutting portion 30c thereof abuts on the abutted portion 7k of the upper base plate 7, and is stopped. Thereby, the locking portion 30a of the release member 30 enters the operation locus of the pushed portion 28a of the hold auxiliary member 28, and is brought into a state where the rotation of the hold auxiliary member 28 in the clockwise direction can be prevented. When the rotation of the auxiliary setting member 18 stops and the unlocking mechanism is brought into such a state is when an oversetting state described in the setting operation of the opening and closing drive mechanism is brought about.

If the setting member 13 is returned to its initial position from such an oversetting state as described above, the auxiliary setting member 18 is also rotated in the clockwise direction. Thus, the hold auxiliary member 28 is also rotated in the clockwise direction by the urging force of the second spring (not shown) hung between the hold auxiliary member and the hold member 27. However, the pushed portion 28a of the hold auxiliary member 28 is locked to the locking portion 30a of the release member 30 and is stopped, in a place where the rotation thereof has been slightly rotated.

Since the rotation of the hold auxiliary member 28 at this time is within a range where the urging force of the second spring (not shown) hung between the hold auxiliary member and the hold members 27 acts, the hold member 27 does not rotate, and the pressing portions 29a and 29b of the pressing member 29 still bring the iron piece members 24 and 26 into contact with the iron core members 19a and 20a. Such a state is the setting completion state, that is, the photographing standby state, of the unlocking mechanism shown in FIG. 6.

As already described, the digital camera including the focal plane shutter of the present example includes the selecting means that selects whether the photographing mode using an optical finder or the photographing mode using a monitor is selected, the release button for still image photographing, and the release button for moving image photographing. In the case where the photographing using an optical finder is selected, however, the release button for moving image photographing is locked so as not to be pushed. Therefore, in the setting completion state shown in FIGS. 5 and 6, that is, in the photographing standby state when the photographing mode using an optical finder is selected, the release button for moving image photographing cannot be pushed. Additionally, since an electric current is applied to the photoelectric sensors 47 and 48 from when a power source of the camera is turned on, in this setting completion state, the optical paths of both the photoelectric sensors are cut off by the light-shielding portions 35a and 41a of the arms 35 and 41 to output an L signal.

When a photographer pushes a release button of a camera in this standby state while observing the image of a subject with an optical finder, first, a movable mirror is flipped up to withdraw from a photographing optical path; second, an electric current is applied to the coil 19b of the electromagnet 19 for a first blade and the coil 20b of the electromagnet 20 for a second blade. Therefore, the iron piece members 24 and 26 which are merely brought into contact with the iron core members 19a and 20a until then are attracted to the iron core members 19a and 20a by electromagnetic forces. Thus, next, since the member (not shown) on the side of a camera body pushes the pushed portion 30b of the release member 30, the release member 30 rotates in the clockwise direction in FIG. 6 to release the lock of the hold auxiliary member 28 which has been performed by the locking portion 30a.

The hold auxiliary member 28 which has released the lock of the pushed portion 28a rotates in the clockwise direction along with the hold member 27 by the urging force of the first spring (not shown) after having rotated extremely slightly by the urging force of the second spring (not shown). If the hold member 27 starts to rotate in the clockwise direction in this way, as described above, since the iron core members 24 and 26 have already been attracted by the iron core members 19a and 20a, the unlocking member 23 for a first blade and the unlocking member 25 for a second blade cannot be rotated by the urging force of each spring (not shown), and the pressing portions 29a and 29b of the pressing member 29 separate from the pushed portions 24a and 26a of the iron piece members 24 and 26. The rotation of the hold member 27 and the hold auxiliary member 28 in the clockwise direction is stopped as the pushed portion 28a of the hold auxiliary member 28 abuts on the pushing portion 18a of the auxiliary setting member 18.

Figure 7:
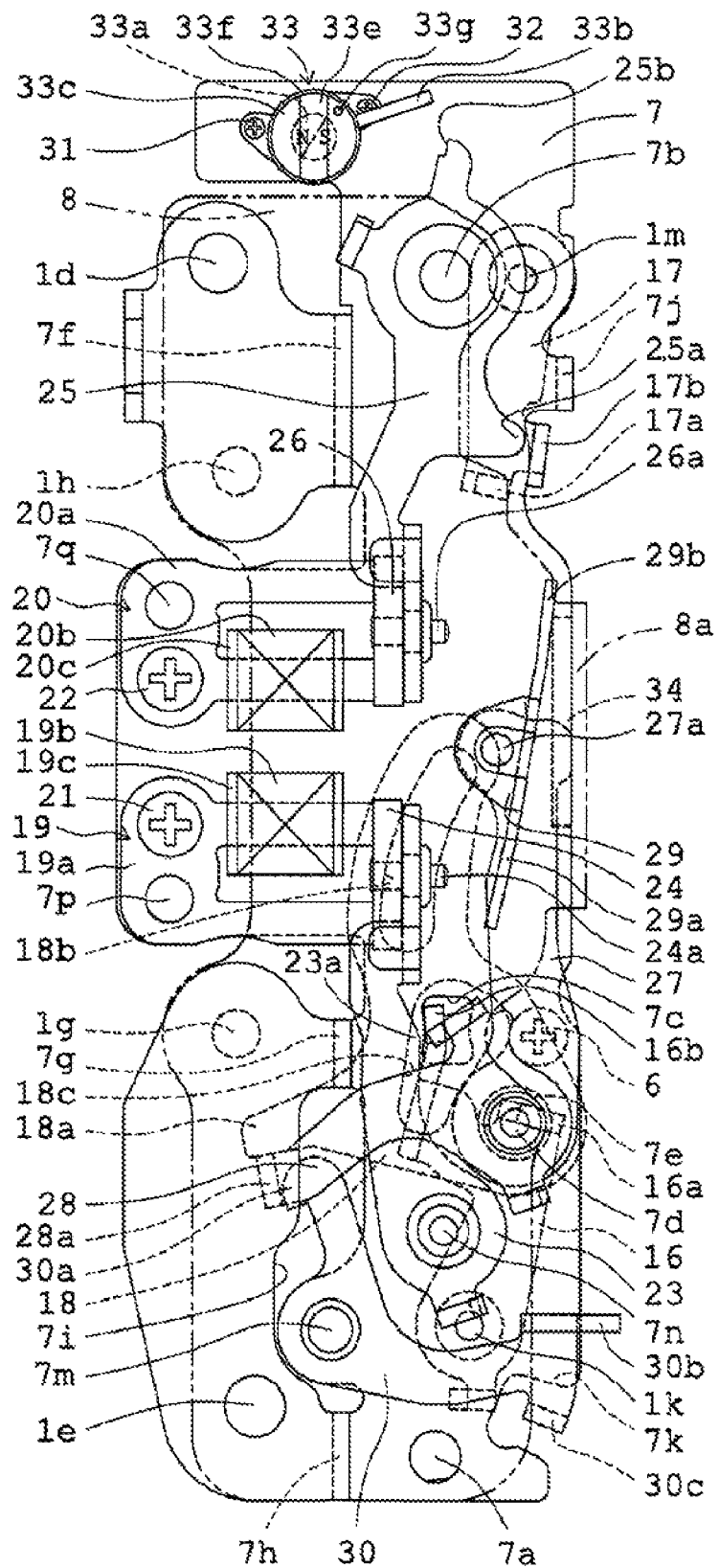
FIG. 7 is a plan view showing a phenomenon which is generated by the unlocking mechanism shown in FIG. 3 immediately after the release of a camera.

Although the rotation of the hold member 27 is stopped in this way, the pressing member 29 attached to the hold member 27 at that time inclines greatly and vibrates about the shaft 27a. In the case of the present example, the shock-absorbing member 34 made of rubber is attached to the bent portion 8a of the cover plate 8. Thus, if the pressing member 29 inclines, either of the pushing portions 29a and 29b abuts on the shock-absorbing member 34, and the vibration of the pressing member 29 is settled at an early stage. FIG. 7 shows a state where the pressing portion 29b of the pressing member 29 abuts on the shock-absorbing member 34 through such inclination. Additionally, a state where the pressing member 29 takes an ideal posture and becomes still after that is shown in FIG. 8.

Figure 8:
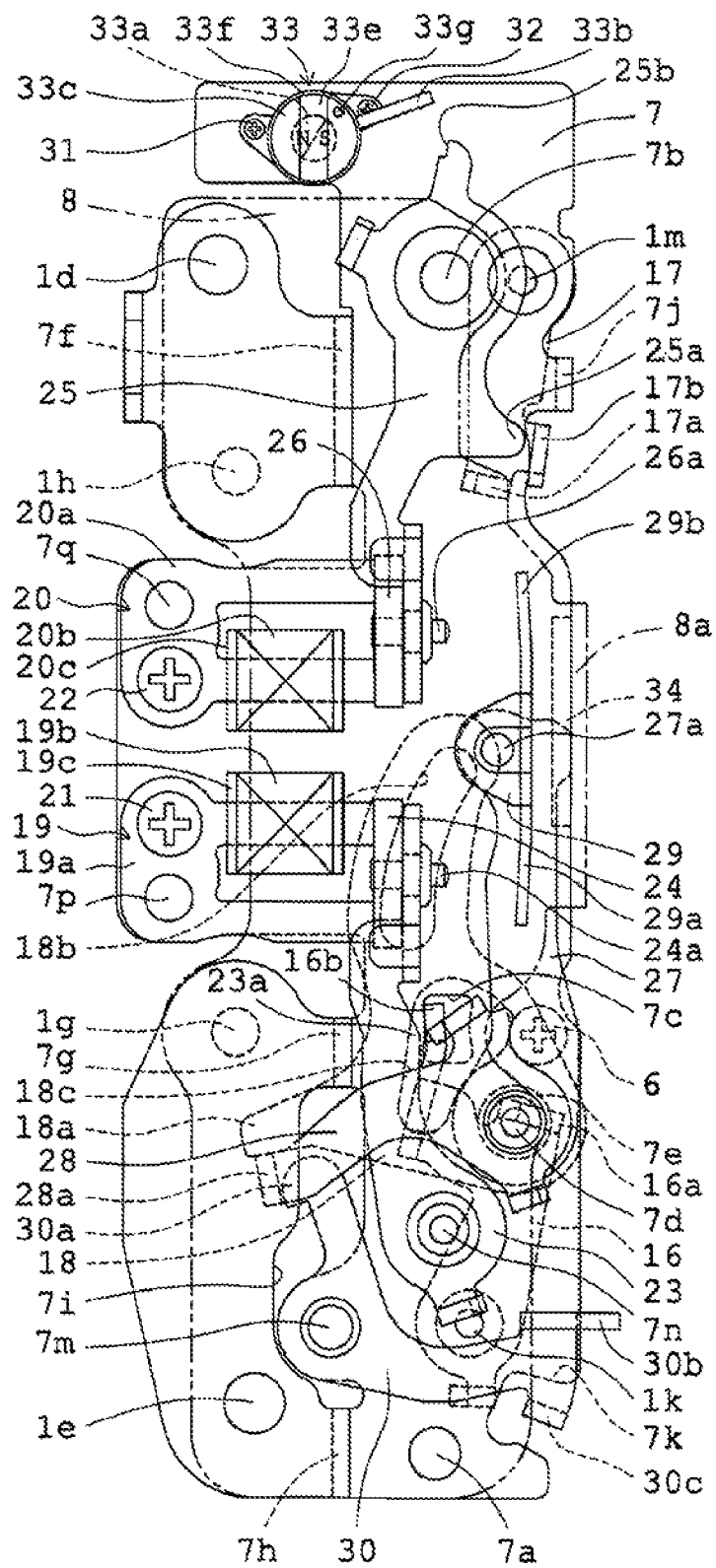
FIG. 8 is a plan view showing the state of the unlocking mechanism immediately after the state shown in FIG. 7.
Figure 9:
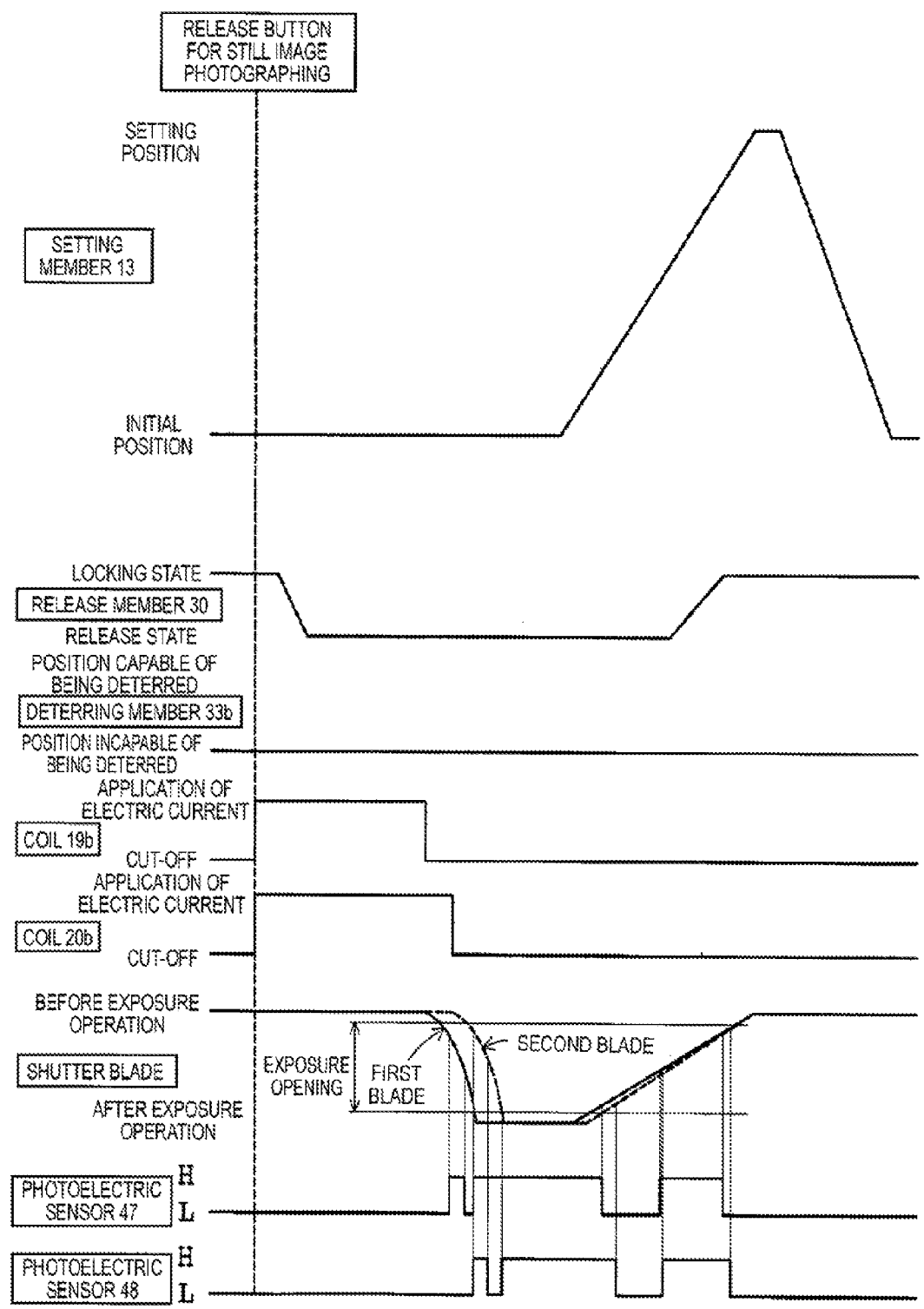
FIG. 9 is a timing chart showing the operational relationship between main constituent members in a case where still image photographing is performed in a photographing mode using an optical finder.

If the state shown in FIG. 8 is obtained, next, an electric current applied to the coil 19b of the electromagnet 19 for a first blade is cut off. Therefore, since the attraction force to the iron piece member 24 is lost, the unlocking member 23 for a first blade is rotated in the clockwise direction by the urging force of the release spring (not shown) for a first blade. In this process, the pushing portion 23a pushes the pushed portion 16b of the locking member 16 for a first blade. Therefore, the locking member 16 for a first blade is rotated in the clockwise direction against the urging force of the spring (not shown), and releases the lock of the driving member 10 for a first blade which has been locked by the locking portion 16a until then. Then, the rotation of the unlocking member 23 for a first blade after that stops as the pushing portion 23a presses the pushed portion 16b of the locking member 16 for a first blade against the edge of the hole 7c formed in the upper ground plate 7.

In the present example, as described above, the pressing member 29 inclines greatly and vibrates when the hold member 27 has rotated and stopped in the clockwise direction. Thus, the shock-absorbing member 34 is provided in order to bring the pressing member to a standstill at an early stage. However, in a case where the shock-absorbing member 34 is not provided, even after the rotation of the hold member 27 has stopped, the pressing member 29 cannot be brought to a standstill at an early stage. Therefore, if the pushed portion 24a of the iron piece member 24 abuts on the pressing portion 29a of the pressing member 29 which have happened to rotate in the clockwise direction before the application of an electric current to the coil 19b of the electromagnet 19 for a first blade is cut off after that so as to rotate the unlocking member 23 for a first blade in the clockwise direction and release the lock of the driving member 10 for a first blade by the locking member 16 for a first blade, the timing at which the lock of the driving member 10 for a first blade is released by the locking member 16 for a first blade will be later than the predetermined timing.

Additionally, in that case, when the pressed portion 24a of the iron piece member 24 abuts on the pressing portion 29a of the pressing member 29, the inclination of the pressing member 29 is not always the same. Thus, the shift of the timing at which the lock of the driving member 10 for a first blade is released will also be different at every photographing. Therefore, when the timing at which the lock of the driving member 10 for a first blade is released is not fixed, and a subject in the same state is photographed plural times, a situation commonly known as irregular release occurs in which photographs always having the same exposure state are not obtained.

Additionally, in order to avoid such a situation without providing the shock-absorbing member 34 unlike the present example, the time until the application of an electric current to the coil 19b of the electromagnet 19 for a first blade be cut off after the release member 30 releases the lock of the hold auxiliary member 28 may be lengthened. However, if so, the time until the first blade actually starts the exposure operation after the release button for a still image is pushed will become long, and the possibility that, if a subject is moving, a shutter chance may be missed increases. In the present example, occurrence of such a situation is prevented by providing the shock-absorbing member 34.

If the unlocking member 23 for a first blade releases the lock of the locked portion 10a of the driving member 10 for a first blade using the locking portion 16a of the locking member 16 for a first blade, the driving member 10 for a first blade is quickly rotated in the clockwise direction by the urging force of the driving spring (not shown) for a first blade from the state of FIG. 5. Therefore, the four blades 37 to 40 of the first blade operate downward of the opening portion 1a while increasing the overlap between adjacent blades, and opens the opening portion 1a by means of the upper end edge of the slit forming blade 40. Then, as is well known, in a case where a subject is dark or in a case where flash photographing is performed, the four blades 37 to 40 of the first blade fully open the opening portion 1a, and then the two driving members 11 and 12 for a second blade are rotated in the clockwise direction. However, in the description of the operation of the present example, a case where a subject is bright and photographing is performed without using flash will be described.

If predetermined time has lapsed after an electric current applied to the coil 19b of the electromagnet 19 for a first blade is cut off as described above, an electric current applied to the coil 20b of the electromagnet 20 for a second blade is cut off. Therefore, since the attraction force to the iron piece member 26 is lost, the unlocking member 25 for a second blade is rotated in the counterclockwise direction by the urging force of the release spring (not shown) for a second blade from the state of FIG. 8. In this process, the pushing portion 25a pushes the pushed portion 17b of the locking member 17 for a second blade. Thereby, the locking member 17 for a second blade is rotated in the counterclockwise direction against the urging force of the spring (not shown), and releases the lock of the second driving member 12 for a second blade which has been locked by the locking portion 17a until then. Then, the rotation of the unlocking member 25 for a second blade after that stops as the pushing portion 25a presses the locking member 17 for a second blade against the bent portion 7j formed in the upper ground plate 7.

If the lock caused by the locking member 17 for a second blade is released in this way, the second driving member 12 for a second blade is quickly rotated in the clockwise direction by the urging force of the driving spring for a second blade (not shown) from the state of FIG. 5. However, in the initial stage, the edge of the window portion 12b pushes the engaging portion 11a of the first driving member 11 for a second blade. Thus, the first driving member 11 for a second blade also starts to rotate in the clockwise direction. Accordingly, the two driving members 11 and 12 rotate integrally in the clockwise direction after that. Then, if the first driving member 11 for a second blade starts to rotate in the clockwise direction, the four blades 43 to 46 of the second blade operate into the opening portion 1a while making the overlap between adjacent blades small, and the opening portion 1a is closed from above by the lower end edge of the slit forming blade 46. Therefore, the imaging surface of an imaging device is exposed downward from above by a slit formed between the slit forming blade 40 of the first blade and the slit forming blade 46 of the second blade since then.

In the case of the present example, the shape of the intermediate plate 2 is different from that in the related art. That is, as already described, the intermediate plate 2 of the present example is formed such that the contour forming edge on the side where the four blades 43 to 46 of the second blade are brought into an overlap state and stored has an arc shape which becomes convex toward the exposure opening, that is, the opening portion 1a side. Therefore, in the setting completion state shown in FIG. 5, the width of overlap of the four blades 43 to 46 of the second blade with the intermediate plate 2 becomes small substantially at the central portion in the length direction of the blades. Thus, the reason why the intermediate plate 2 of the present example has such a shape will be described here.

As is well known, in the case where the first blade is arranged between the shutter ground plate 1 and the intermediate plate 2 and the second blade is arranged between the intermediate plate 2 and the auxiliary ground plate 3, as in the present example, a largest interval is required in a place where the four blades 37 to 40 of the first blade is brought into an overlap state between the shutter ground plate 1 and the intermediate plate 2, and a largest interval is required in a place where the four blades 43 to 46 of the second blade is brought into an overlap state between the intermediate plate 2 and the auxiliary ground plate 3. That is, in the case of the present example, the blade chamber between the shutter ground plate 1 and the intermediate plate 2 requires the largest interval below the opening portion 1a, and the blade chamber between the intermediate plate 2 and the auxiliary ground plate 3 requires the largest interval above the opening portion 1a.

In recent years, the interval between the shutter ground plate 1 and the auxiliary ground plate 3 is required to be made as small as possible with the miniaturization of a camera. Therefore, when the blades are brought into an overlap state, the four blades 37 to 40 of the first blade are strongly pinched by the shutter ground plate 1 and the intermediate plate 2, and the four blades 43 to 46 of the second blade are strongly pinched by the intermediate plate 2 and the auxiliary ground plate 3. Therefore, when the operation to the development state from the overlap state is performed even in the case of the four blades 37 to 40 of the first blade, and even in the case of the four blades 43 to 46 of the second blade, it is necessary to start the operation against a larger frictional resistance force than the related art.

In such a situation, in the case of the present example, when the four blades 37 to 40 of the first blade are operated to the development state from the overlap state is when the setting operation is performed. Therefore, even if the starting timing of the operation becomes somewhat instable in the case of the first blade, no serious problem is caused. However, when the four blades 43 to 46 of the second blade are operated to the development state from the overlap state is when the exposure operation is performed. Therefore, it is a serious problem if the starting timing of the operation becomes instable even a little.

Thus, in the case of the present example, in order to make the contact area between the blade 43 of the second blade and the intermediate plate 2 in the overlap state efficiently small in terms of an overall configuration, the contour forming edge of the intermediate plate 2 is made arc-like. That is, the positions of both upper ends of the intermediate plate 2 are set as in the related art in order to provide the convenience of attachment to the shutter ground plate 1 or in order to keep the attachment portion from interfering with the operation of the blades. In addition, the reason why the upper end edge is formed in the shape of an arc is because consideration is made such that, when the blade 41 starts to operate, the operation is smooth, and inclination in a right-and-left direction does not easily occur even a little. In addition, if the contact area between the blade 43 of the second blade and the intermediate plate 2 in the overlap state can be made small, equivalent effects are obtained even if the shape of the contour forming edge is not made arc-like unlike the present example.

Here, return is made to the description of the exposure operation using the first blade and the second blade. In the first blade and the rear edge in the present example, slits are formed at predetermined intervals as described above to expose the imaging surface of the imaging device. However, as is well known, it is required that the amount of exposure is the same in all regions of the imaging surface. Even if a shutter unit is manufactured according to predetermined standards when being manufactured, when the shutter unit is assembled into a camera body or after a camera is sold, distribution of the amount of exposure of the imaging surface may become no longer constant, and unevenness of exposure may occur. Thus, a camera including the focal plane shutter of the present example can correct the unevenness of exposure automatically, even if such a situation occurs.

Thus, in order to allow for such correction, in the present example, as described above, the two photoelectric sensors 47 and 48 are attached to the shutter ground plate 1, the arm 35 of the first blade is formed with the light-shielding portions 35a and 35b, and the arm 41 of the second blade is formed with the light-shielding portions 41a and 41b. Thus, slit width is detected at three places including a place when the slit formed by the first blade and the second blade is in an upper region of the opening portion 1a, and a place when the slit is in a middle region thereof, and a place when the slit is in a lower region thereof.

The detection of the slit width in the respective regions is performed by detecting the time until the light-shielding portion 41a of the arm 41 withdraws from the optical path of the photoelectric sensor 48 after the light-shielding portion 35a of the arm 33 retreats from the optical path of the photoelectric sensor 47 in the case of the upper region, by detecting the time until the light-shielding portion 41b of the arm 41 cuts off the optical path of the photoelectric sensor 48 after the light-shielding portion 35b of the arm 35 cuts off the optical path of the photoelectric sensor 47 in the case of the middle region, and by detecting the time until the light-shielding portion 41b of the arm 41 retreats from the optical path of the photoelectric sensor 48 after the light-shielding portion 35b of the arm 35 retreats from the optical path of the photoelectric sensor 47 in the case of the lower region.

In addition, the correction based on such detection results of the slit width may be made, for example, by performing the next photographing with appropriate exposure such that a control circuit on the side of a camera electrically finely adjusts the timing at which an electric current applied to the coil 20b of the electromagnet 20 for a second blade is cut off. However, it is also possible to perform correction by calling information on an image photographed at the time of detection from a storage device to an image processing circuit on the side of a camera body, and to store the image information after the correction in the storage device.

The four blades 37 to 40 of the first blade and the four blades 43 to 46 of the second blade form a slit and move downward between the slit forming blades 40 and 46. However, the exposure operation of the first blade is stopped as the driving pin 10c of the driving member 10 for a first blade abuts on the shock-absorbing member 4 immediately after the four blades 37 to 40 are brought into an overlap state and withdraws from the opening portion 1a to the lower position thereof, and the exposure operation of the second blade is stopped as the driving pin 11b of the first driving member 11 for a second blade abuts on the shock-absorbing member 5 immediately after the four blades 43 to 46 are brought into a development state and fully close the opening portion 1a. That state is the state shown in FIGS. 1 and 2. As already described, the setting operation is performed immediately after imaging information is stored in the storage device in this state. However, in parallel to this, a movable mirror provided on the side of a camera body returns to the inside of the photographing optical path.

Figure 6:
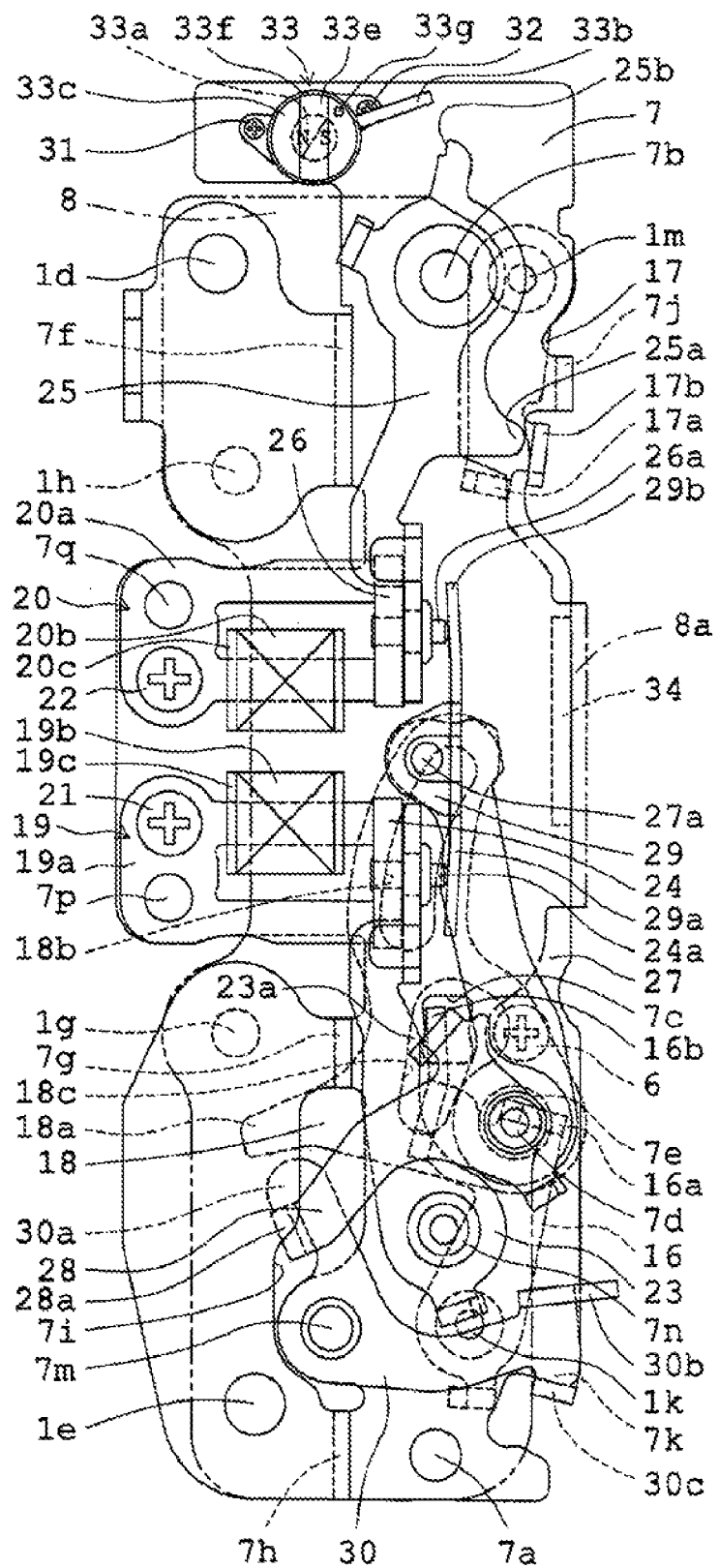
FIG. 6 is a plan view showing the setting completion state of the unlocking mechanism shown in FIG. 3.

Since the setting operation is performed immediately after the end of photographing, in a case where switching to the photographing mode using a monitor from the photographing mode using an optical finder, a photographer manipulates the selecting means provided at the camera, in the photographing standby state in the photographing mode using an optical finder shown in FIGS. 5 and 6. Then, in the case where the photographing mode using a monitor is selected in this way, the release button for moving image photographing locked till then can also be pushed in addition to the release button for still image photographing. As a result, a movable mirror which has returned to the inside of a photographing optical path is evacuated out of a photographing optical path. Additionally, in contrast, the state shown in FIGS. 5 and 6 is brought into the setting state in the photographing mode using a monitor, that is, the photographing standby state.

Figure 11:
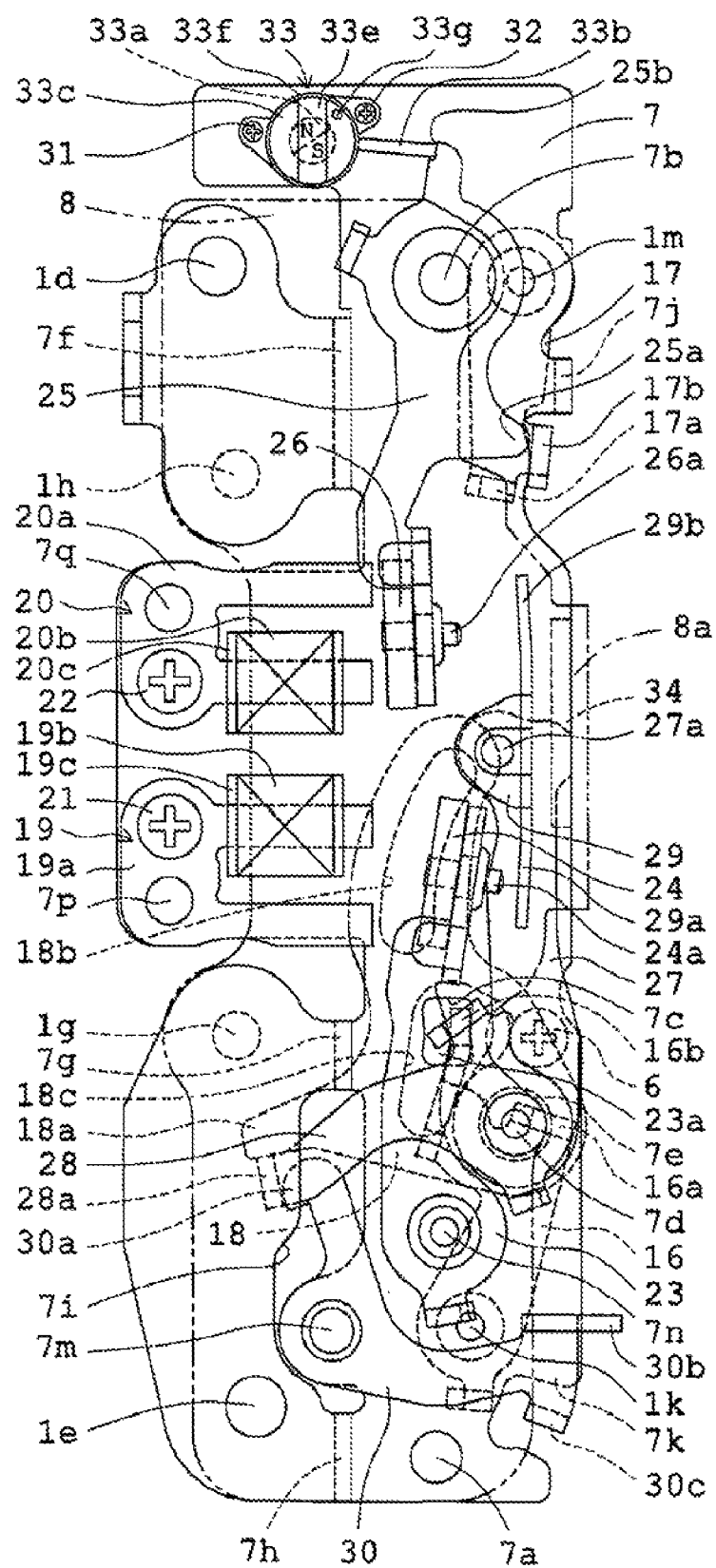
FIG. 11 is a plan view showing a photographing standby state of the unlocking mechanism in a case where photographing is performed in the photographing mode using a monitor.
Figure 12:
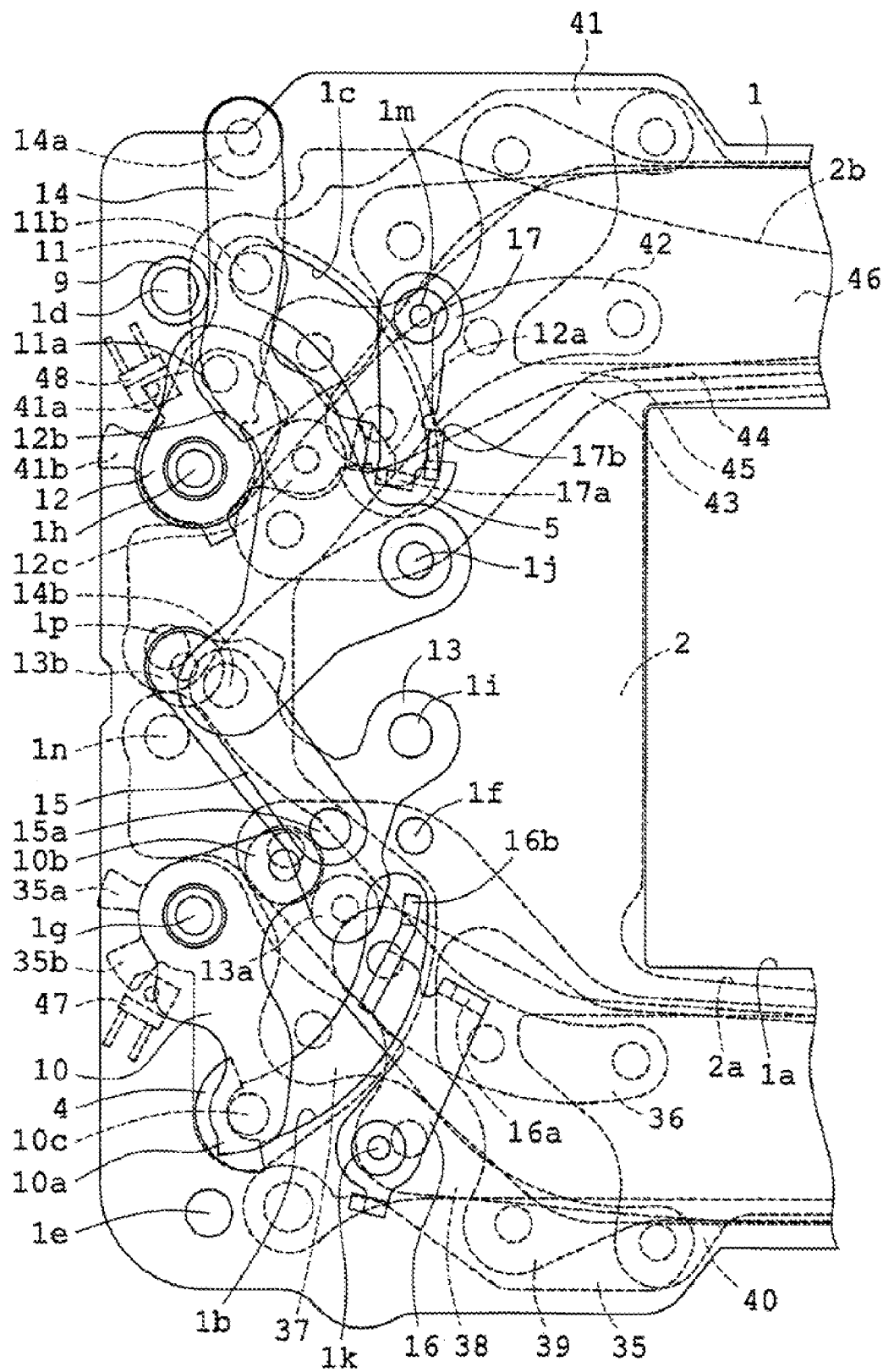
FIG. 12 is a plan view showing a photographing standby state of the opening and closing driving mechanism in a case where photographing is performed in the photographing mode using a monitor.
Figure 13:
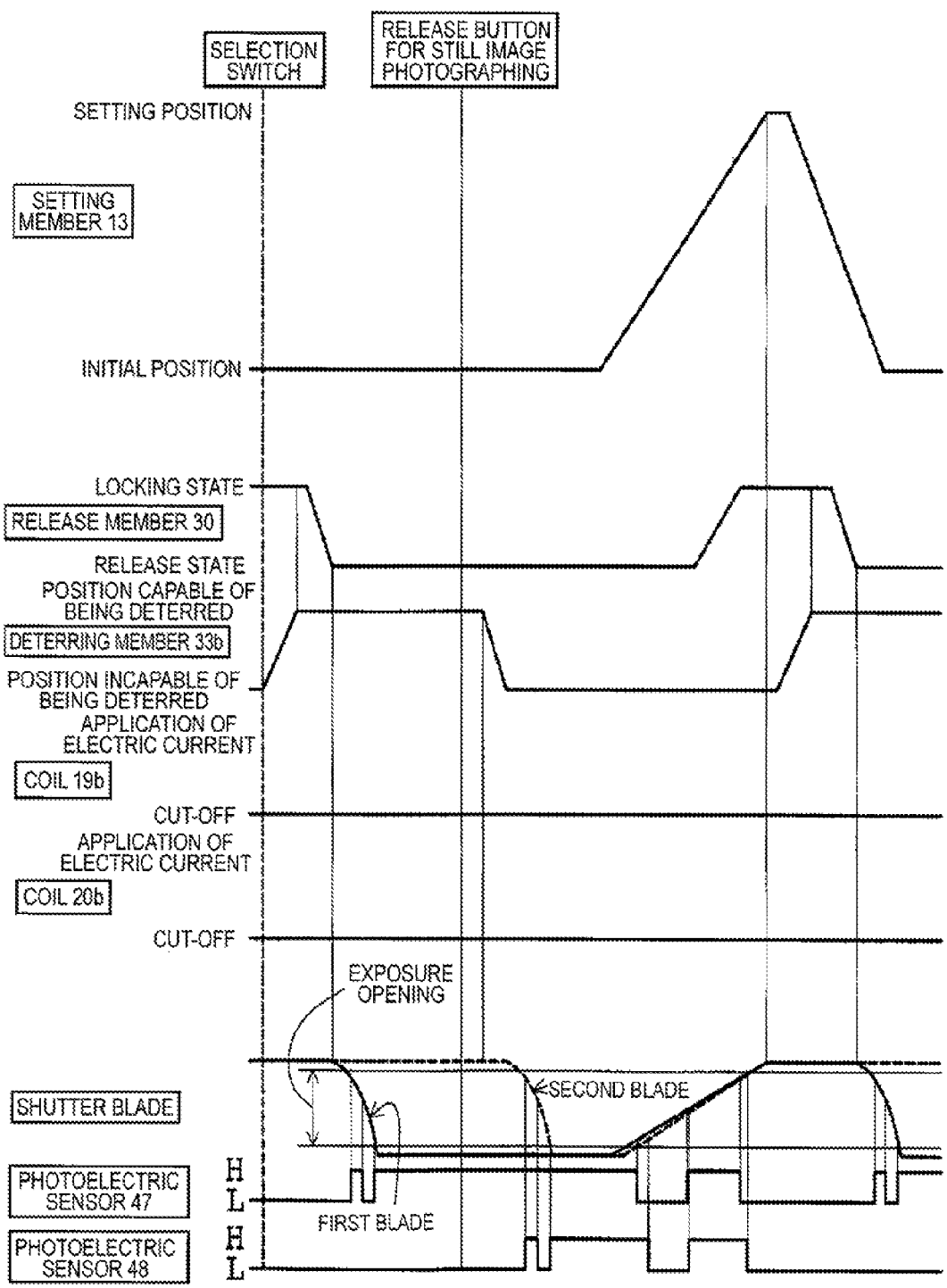
FIG. 13 is a timing chart showing the operational relationship between main constituent members in a case where still image photographing is performed in the photographing mode using a monitor.

Thus, the operation for switching the photographing standby state in the photographing mode using an optical finder shown in FIGS. 5 and 6 to the photographing standby state in the photographing mode using a monitor will first be described newly with reference to FIGS. 10 to 13. In addition, FIG. 13 is a timing chart illustrating not only an operation when switching to the photographing standby state in the photographing mode using a monitor such from the photographing standby state in the photographing mode using an optical finder is made, but also an operation in a case where still image photographing is performed in the photographing mode using a monitor.

As already described, in the photographing standby state in the photographing mode using an optical finder shown in FIG. 6, an electric current is not applied to the coils 19b and 20b of the two electromagnets 19 and 20. If the selecting means provided at the camera is manipulate in this state to perform switching to the photographing mode using a monitor, an electric current in a forward direction is supplied to the coil 33e of the electromagnetic device 33. Therefore, the permanent magnet rotor 33a is rotated in the clockwise direction from the state of FIG. 6, and the deterring member 33b is made to face the inside of the operation locus of the unlocking member 25 for a second blade. The deterring member 33b is stopped at a position capable of being deterred by abutting on the stopper (not shown), and the state where the application of an electric current to coil 33e is cut off is the state shown in FIG. 10. In this state, however, as is well known, even if application of an electric current to the coil 33e is cut off, the rotational position of the permanent magnet rotor 33a is maintained by the positional relationship with the iron pin 33g.

Figure 10:
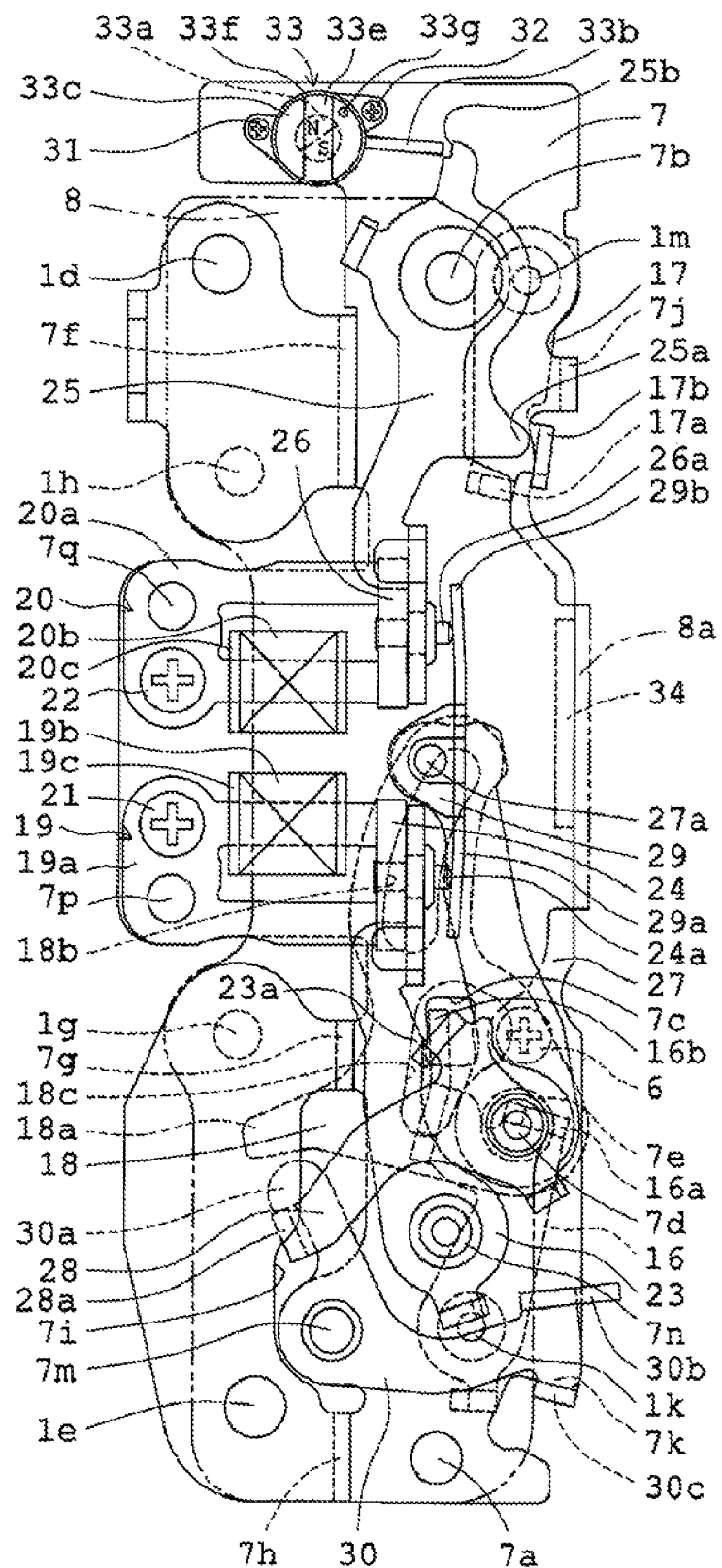
FIG. 10 is a plan view of the unlocking mechanism showing a state where an electromagnetic device is operated from the state of FIG. 6 by selecting the photographing mode using a monitor.

If the state shown in FIG. 10 is obtained, the member on the side of a camera body rotates the release member 30 in the clockwise direction immediately after the state. Thereby, as already described, the hold member 27 and the hold auxiliary member 28 rotate in the clockwise direction. At this time, as described above, an electric current is not applied to the coils 19b and 20b of the two electromagnets 19 and 20 ("cut-off" in the description of FIG. 13). Therefore, when the hold member 27 starts to rotate in the clockwise direction, the unlocking member 23 for a first blade and the unlocking member 25 for second blade which have been pushed by the pressing member 29 to bring the iron piece members 24 and 26 into contact with the iron core members 19a and 20a until then is started to rotate by the urging force of each release spring (not shown).

At this time, the unlocking member 23 for a first blade continues rotating in the clockwise direction so as to follow the suppression member 29, and finally pushes the pushed portion 16b of the locking member 16 for a first blade by the pushed portion 23a. However, since the deterred portion 25b of the unlocking member 25 for a second blade abuts on the deterring member 31b immediately, the rotation of the unlocking member will be deterred, and the pushed portion 16b of the locking member 17 for a second blade cannot be pushed by the pushing portion 25a.

As such, since the unlocking member 23 for a first blade rotates to follow the hold member 27 even after the deterring member 31b deters the unlocking member 25 for a second blade from rotating in the counterclockwise direction, the pushing portion 23a pushes the pushed portion 16b, whereby the locking member 16 for a first blade is rotated in the clockwise direction to release the lock of the driving member 10 for a first blade. Then, the rotation of the unlocking member 25 for a second blade immediately after that is stopped as the pushing portion 23a presses the pushed portion 16b against the edge of the hole 7c of the upper ground plate 7. The state is the photographing standby state of the unlocking mechanism in the photographing mode using a monitor, which is shown in FIG. 11.

When the locking using the locking member 16 for a first blade is released as described above, the driving member 10 for a first blade is quickly rotated in the clockwise direction by the urging force of the driving spring (not shown) for a first blade as already described. Then, after the four blades 37 to 40 of the first blade fully opens the opening portion 1a, the driving pin 10c is stopped by abutting on the shock-absorbing member 4. FIG. 12 shows a state at that time. This state is the photographing standby state of the opening and closing driving mechanism in the case of the photographing mode using a monitor in which observation of an image of a subject in the monitor is allowed.

In addition, in the present example, detection signals of the photoelectric sensors 47 and 48 change when the switching between the photographing mode using an optical finder and the photographing mode using a monitor is performed and when photographing in the photographing mode using a monitor is performed. However, all of these detection signals are ignored. For this reason, in a case where the photographing mode using a monitor is selected by the selecting means provided at the camera, application of an electric current to the photoelectric sensors 47 and 48 may be automatically cut off.

Next, a case where still image photographing is performed from such a photographing standby state will be described. In that case, the release button for still image photographing is pushed similarly to the photographing mode using an optical finder. Thereby, the electronic control circuit discharges the charges accumulated in the imaging device until then and starts the accumulation of charges newly, whereby photographing begins. Then, if a predetermined period of time has lapsed, in the state of FIG. 11, an electric current in the reverse direction is supplied to the coil 33e of the electromagnetic device 33. Therefore, the permanent magnet rotor 33a is rotated in the counterclockwise direction, and the deterring of the unlocking member 25 for a second blade by the deterring member 33b is released. Then, if the deterring member 33b abuts on the stopper (not shown) and is stopped at a position incapable of being deterred, application of an electric current to the coil 33e is cut off.

On the other hand, the unlocking member 25 for a second blade which has released the deterring cased by the deterring member 33b from the state of FIG. 11 is rotated in the counterclockwise direction by the urging force of the release spring (not shown) for a second blade, and the pushing portion 25a pushes the pushed portion 17b of the locking member 17 for a second blade, whereby the lock of the second driving member 12 for a second blade by the locking member 17 for a second blade is released. The rotation of the unlocking member 25 for a second blade after that is stopped as the locking member 17 for a second blade abuts on the bent portion 7j formed in the upper ground plate 7. Then, the state of the unlocking mechanism of the present example at that time becomes the same as the state shown in FIG. 3.

If the lock caused by the locking member 17 for a second blade is released in this way, the second driving member 12 for a second blade is quickly rotated in the clockwise direction by the urging force of the driving spring for a second blade (not shown) from the state of FIG. 12. However, in the initial stage, the edge of the window portion 12b pushes the engaging portion 11a of the first driving member 11 for a second blade, whereby the first driving member 11 for a second blade is rotated in the clockwise direction. Therefore, the four blades 43 to 46 of the second blade the close the opening portion 1a from above while the overlap between adjacent blades is made small. If the four blades 43 to 46 of the second blade completely close the opening portion 1a, the rotation of the first driving member 11 for a second blade and the second driving member 12 for a second blade is stopped as the driving pin 11b abuts on the shock-absorbing member 5. The opening and closing driving mechanism of the present example at that time becomes the same as the state shown in FIG. 2.

If the opening and closing driving mechanism and unlocking mechanism of the present example are brought into the state shown in FIGS. 2 and 3 as described above, a setting operation is performed immediately after imaging information is transmitted via an image processing circuit from an imaging device and is stored in a storage device. The setting operation is completely the same as the photographing mode using an optical finder until the state shown in FIGS. 5 and 6 are brought about. Therefore, although that description thereof is omitted, even if the state shown in those FIGS. 5 and 6 is brought about in the case of this photographing mode using a monitor, the setting operation is not completed, but is further continued after that.

That is, after being brought into the state shown in FIGS. 5 and 6, similarly to the operation described when switching is made to the photographing mode using a monitor from the photographing mode using an optical finder, the unlocking mechanism is operated from the state shown in FIG. 6 through the state shown in FIG. 10 to the state shown in FIG. 11, whereby the setting operation in the photographing mode using a monitor is completed. Therefore, at this time, the opening and closing driving mechanism is also operated from the state shown in FIG. 5 to the state shown in FIG. 12, and the observation of an image of a subject before photographing is allowed by monitor.

Next, the operation in the case where moving image photographing is performed when the selecting means on the side of the camera selects the photographing mode using a monitor will be described with reference to the timing charge of FIG. 14 instead of FIG. 13 will be described. In addition, FIG. 14 not only shows the operation in the case where moving image photographing is performed, but also shows a case where the photographing standby state in the photographing mode using an optical finder is switched to the photographing standby state in the photographing mode using a monitor, similarly to the case of FIG. 13. Since such a switching operation is performed as already described, the description of the switching operation is omitted here.

Additionally, the photographing standby state in the case where moving image photographing is performed is completely the same as the photographing standby state in the case where still image photographing is performed in the photographing mode using a monitor. Therefore, since the unlocking mechanism is brought into the state shown in FIG. 11, the opening and closing driving mechanism is brought into the state shown in FIG. 12, the observation of an image of a subject is allowed using a monitor. However, in the case where moving image photographing is performed, the release button for still image photographing is not pushed, and as described above, the release button for moving image photographing of which the lock is released when the photographing mode using a monitor is selected by the selecting means is pushed.

Figure 14:
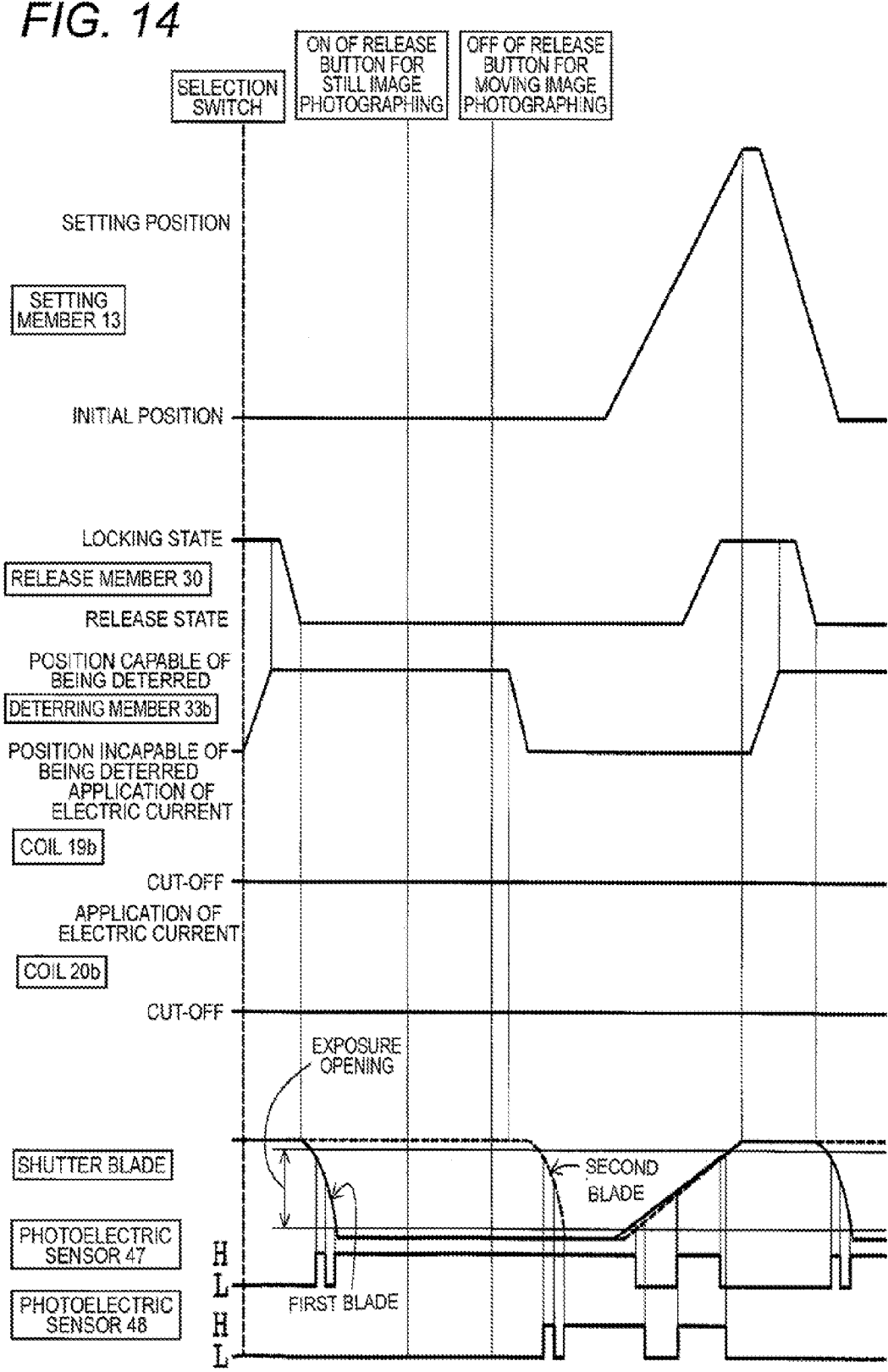
FIG. 14 is a timing chart showing the operational relationship between main constituent members in a case where moving image photographing is performed in the photographing mode using a monitor.

If the release button for moving image photographing is pushed ("ON of the release button for moving image photographing" in the description of FIG. 14), the electronic control circuit discharges the charges accumulated in the imaging device until then and starts the accumulation of charges anew, whereby photographing of a moving image is started, and the photographing of a moving image is continued while the release button for moving image photographing is pushed. Then, if the release button for moving image photographing is detached (OFF of the release button for moving image photographing" in the description of FIG. 14), an electric current in the reverse direction is supplied to the coil 33e of the electromagnetic device 33 through the releasing signal, and the permanent magnet rotor 33a is rotated in the counterclockwise direction from the state of FIG. 11 to release the deterring of the unlocking member 25 for a second blade by the deterring member 33b. Therefore, the unlocking mechanism of the present example is brought into the shown in FIG. 3 as the unlocking member 25 for a second blade is rotated in the counterclockwise direction by the urging force of the release spring (not shown) for a second blade to release the lock of the second driving member 12 for a second blade by the locking member 17 for a second blade.

On the other hand, if the lock of the second driving member 12 for a second blade by the locking member 17 for a second blade is released in the state of FIG. 12, the second driving member 12 for a second blade is rotated in the clockwise direction with the first driving member 11 for a second blade, and the four blades 43 to 46 of the second blade are made to close the opening portion 1a. Then, if the four blades 43 to 46 of the second blade completely close the opening portion 1a, the rotation of the first driving member 11 for a second blade and the second driving member 12 for a second blade is stopped as the driving pin 11b abuts on the shock-absorbing member 5. At that time, the opening and closing driving mechanism of the present example is brought into the state shown in FIG. 2.

When the state shown in FIGS. 2 and 3 is brought about in this way, the opening and closing driving mechanism and unlocking mechanism of the present example perform the setting operation similarly to the case of the setting operation in the still image photographing in the photographing mode using a monitor which has already been described, and are returned to the photographing standby state shown in FIGS. 11 and 12. Accordingly, since the setting completion state after the photographing of a moving image, that is, the next photographing standby state is the photographing standby state in the photographing mode using a monitor. Therefore, at the time of the next photographing, still image photographing is performed if the release button for still image photographing is pushed, and moving image photographing is performed if the release button for moving image photographing is pushed.

In addition, the above description of the operation of the moving image photographing has been made in the case of performing a series of operations until the next photographing standby state is brought about by supplying an electric current in the reverse direction to the coil 33e of the electromagnetic device 33 so as to release the deterring of the unlocking member 25 for a second blade by the deterring member 33b, through a signal when the release button for moving image photographing is detached in ending the moving image photographing. However, in the case where this moving image photographing is performed, it is also possible to bring about the next photographing standby state simply by detaching the release button for moving image photographing without performing the same setting operation as the case of the still image photographing.

Finally, the operation for switching the photographing standby state in the photographing mode using a monitor shown in FIGS. 1 and 12 to the photographing standby state in the photographing mode using an optical finder will be described. If the selecting means provided at the camera is manipulated to perform switching to the photographing mode using an optical finder, in the state of FIG. 11, an electric current of in the reverse direction is supplied to the coil 33e of the electromagnetic device 33, and the permanent magnet rotor 33a is rotated in the counterclockwise direction. Thereby, if the deterring member 33b releases the deterring of the unlocking member 25 for a second blade, and abuts on the stopper (not shown) at the position incapable of being deterred, the application of an electric current to the coil 33e is cut off.

Then, the unlocking member 25 for a second blade which has released the deterring cased by the deterring member 33b from the state of FIG. 11 is rotated in the counterclockwise direction by the urging force of the release spring (not shown) for a second blade, and the pushing portion 25a pushes the pushed portion 17b of the locking member 17 for a second blade, whereby the lock of the second driving member 12 for a second blade by the locking member 17 for a second blade is released. The rotation of the unlocking member 25 for a second blade after that is stopped as the locking member 17 for a second blade abuts on the bent portion 7j formed in the upper ground plate 7. The state of the unlocking mechanism of the present example at that time becomes the same as the state shown in FIG. 3.

In contrast, if the lock caused by the locking member 17 for a second blade is released in this way, the second driving member 12 for a second blade is quickly rotated in the clockwise direction by the urging force of the driving spring for a second blade (not shown) from the state of FIG. 12, to rotate the first driving member 11 for a second blade in the clockwise direction. Therefore, the four blades 43 to 46 of the second blade close the opening portion 1a from above while the overlap between adjacent blades is made small. Then, if the four blades 43 to 46 of the second blade completely close the opening portion 1a, the rotation of the first driving member 11 for a second blade and the second driving member 12 for a second blade is stopped as the driving pin 11b abuts on the shock-absorbing member 5. The opening and closing driving mechanism of the present example at that time becomes the same as the state shown in FIG. 2.

If the opening and closing driving mechanism and the unlocking mechanism are brought into the state shown in FIGS. 2 and 3, completely the same operation as the setting operation in the photographing mode using an optical finder which has already been described is performed immediately. Then, the operation is brought into the state shown in FIGS. 5 and 6, and is stopped. Accordingly, the state is brought into the photographing standby state in the photographing mode using an optical finder to be performed next. Additionally at this time, the release button for moving image photographing is brought into a locked state.

In addition, in the case of the present example, when switching to the photographing mode using a monitor is performed by the selecting means provided at the camera, either still image photographing or moving image photographing is selected so as be able to perform photographing. However, the invention is not limited thereto, and any one photographing may be performed.

Additionally, the electromagnetic device 33 of the present example has the permanent magnet rotor 33a as described above, and the deterring member 33b is integrated with the permanent magnet rotor 33a. The permanent magnet rotor 33a is equivalent to a movable element of the invention, and the deterring member 33b is equivalent to a deterring means of the invention. However, the invention is not limited to this configuration. For example, the deterring member 33b of the present example may be rotatably attached to the upper ground plate 7 as a member separate from the permanent magnet rotor 33a, and may be configured so as to be reciprocally rotated an output pin or output gear which is output means of the permanent magnet rotor 33a.

Additionally, the electromagnetic device of the invention may be a stepping motor using a permanent magnet rotor as a moving element. In that case, although it is preferable that the deterring means be integrated with the permanent magnet rotor as in the present example, the separate member may be used as the deterring means as described above, and may be reciprocally rotated by the output means of the permanent magnet rotor. Additionally, in the case where the stepping motor is used as the electromagnetic device of the invention in this way, there is no need for providing the stopper for stopping the rotation of the deterring means.

Moreover, the electromagnetic device of the invention may be an electromagnetic plunger using a rod-shaped iron core member made to reciprocate in a solenoid as the moving element. Even in that case, although it is preferable that the deterring means be integrated with the iron core member and advanced and retreated in the operation locus of the unlocking means for a second blade, the separate member may be used as the deterring means as described above, and may be reciprocally rotated by the iron core member.

What is claimed is:

1. A focal plane shutter for a digital camera comprising:
    a first blade and a second blade which are individually arranged in two blade chambers configured such that a space between a shutter ground plate and an auxiliary ground plate is partitioned by an intermediate plate;
    a driving member for the first blade and a driving member for the second blade which are respectively coupled to the first blade and the second blade, and respectively rotated by urging force of a driving spring for the first blade and the urging force of a driving spring for the second blade to cause the first blade and the second blade to perform an exposure operation, if a lock caused by a locking member for the first blade and a lock caused by a locking member for the second blade are released in order;
    a setting member which is located at an initial position retreated out of operation loci of the two driving members when the first blade and the second blade perform an exposure operation, starts a setting operation from the initial position if the exposure operation is completed, and rotates the two driving members to positions capable of being locked to the two locking members against the urging forces of the two driving springs so as to return the driving members to the initial position before photographing;
    an unlocking unit for the first blade and an unlocking unit for the second blade which are respectively attracted to and held by iron core members of an electromagnet for the first blade and an electromagnet for the second blade when an electric current is applied to coils of the two electromagnets, and are respectively separated from the iron core member against an urging force of a release spring for the first blade and an urging force of a release spring for the second blade to individually release the lock of the two driving members by the two locking members, if application of an electric current to the coils of the two electromagnets is cut off in order;
    a holding unit which is configured to be operated so as to interlock with the setting operation of the setting member, pushes the two unlocking units against the urging forces of the two release springs to bring the unlocking unit into contact with the two iron core members, and is operated out of the operation loci of the two unlocking units if an electric current is applied to the coils of the two electromagnets;
    an electromagnetic device having a reciprocable moving element; and
    a deterring unit which is configured to be operated to reciprocate by the moving element, and is advanced and retreated in the operation locus of the unlocking unit for the second blade,
    wherein, when the deterring unit is advanced into the operation locus of the unlocking unit for the second blade in the case where the unlocking unit for the second blade comes into contact with the iron core member of the electromagnet for the second blade, the holding unit is operated out of the operation loci of the two unlocking units without application of an electric current to the coils of the two electromagnets, and, the deterring unit deters the operation of the unlocking unit for the second blade which is separated from the iron core member of the electromagnet for the second blade before the lock of the driving member for the second blade by the locking member for the second blade is released, and then, if the electromagnetic device operates the deterring unit out of the operation locus of the unlocking unit for the second blade, the unlocking unit for the second blade releases the lock of the driving member for the second blade by the locking member for the second blade.

2. The focal plane shutter for a digital camera according to claim 1, wherein the deterring unit is integrated with the moving element of the electromagnetic device.

3. The focal plane shutter for a digital camera according to claim 1, wherein the moving element is a rotor having a permanent magnet.

4. The focal plane shutter for a digital camera according to claim 1, wherein the electromagnetic device is a plunger.

5. The focal plane shutter for a digital camera according to claim 1, wherein
    the driving member for the second blade includes a first driving member for the second blade and a second driving member for the second blade which are rotatably attached on the same axle, the first driving member for the second blade is coupled to the first blade, and rotates to follow the second driving member for the second blade by the urging force of a setting spring during the setting operation, and the second driving member for the second blade is locked to the locking member for the second blade before the second blade is made to start an exposure operation, and rotates while pushing the first driving member for the second blade by the urging force of the driving spring for the second blade against the urging force of the setting spring when the lock to the locking member for the second blade is released.

6. The focal plane shutter for a digital camera according to claim 1, wherein
    the second blade includes two arms pivotally attached to the shutter ground plate, and a plurality of substantially strip-shaped blades pivotally supported on the arms in order in a length direction, the blades are adapted to withdraw into an overlap state from an exposure opening in the state immediately before the start of an exposure operation, the intermediate plate has an arc shape such that the contour line of a region which overlap the plurality of blades in an overlap state becomes convex toward the exposure opening, and the plurality of blades are formed such that the overlap therebetween becomes small, substantially at central portions of the blades in the length direction.

7. The focal plane shutter for a digital camera according to claim 1, wherein the holding unit, to which a pressing member having two pressing portions is rotatably attached within a predetermined angle of rotation, pushes the two unlocking units against the urging forces of the two release springs using the two pressing portions when being operated so as to interlock with the setting operation of the setting member, is locked to a release member in a state where the two unlocking units are brought into contact with the two iron core members, and is operated out of the two operation loci of the two unlocking units by the urging forces of the release springs if the lock of the release member is released, and at least one pressing portion of the pressing member is allowed to abut on a shock-absorbing member attached to a member integral with the shutter ground plate at the time of the stop of operation by the urging forces of the release springs.

* * * * *